United States Patent [19]
Chau et al.

[11] Patent Number: 5,805,827
[45] Date of Patent: Sep. 8, 1998

[54] DISTRIBUTED SIGNAL PROCESSING FOR DATA CHANNELS MAINTAINING CHANNEL BANDWIDTH

[75] Inventors: Wing Cheong Chau, Los Altos; Dar-Ren Leu, San Jose, both of Calif.

[73] Assignee: 3Com Corporation, Santa Clara, Calif.

[21] Appl. No.: 610,706

[22] Filed: Mar. 4, 1996

[51] Int. Cl.$^6$ .................................................. H04L 12/46
[52] U.S. Cl. ................................ 395/200.77; 395/200.76
[58] Field of Search ...................... 395/200.77, 200.76, 395/888, 182, 200.66, 200.67, 200.68, 186, 187.01; 364/715.02, 715.03; 380/42

[56] References Cited

U.S. PATENT DOCUMENTS

| | | | |
|---|---|---|---|
| 4,954,945 | 9/1990 | Inoue ...................................... | 395/675 |
| 5,195,181 | 3/1993 | Bryant et al. ...................... | 395/200.45 |
| 5,276,898 | 1/1994 | Kiel et al. ............................... | 395/675 |
| 5,490,252 | 2/1996 | Macera et al. ...................... | 395/200.79 |
| 5,530,703 | 6/1996 | Liu et al. ................................ | 370/255 |
| 5,590,328 | 12/1996 | Seno et al. ............................. | 395/675 |
| 5,594,869 | 1/1997 | Hawe et al. ........................ | 395/187.01 |

OTHER PUBLICATIONS

Xylogics Remote Access Products, Worldwide IT Analyst, Datapro Information Services Group, Document No. 3780LNI, pp. 1–10, Sep. 1995.

Telco Systems/Magnalink Remote Bridges and Network Data Compression Systems, Worlwide IT Analyst, Datapro Information Services Group, Document No. 3670LIN, pp. 1–8, Jun. 1994.

Mohldeen et al., A Thread–Dispatching Kernel for Event–Driven Applications, 1990 Int'l. Phoenix Conference on Computers and Communications, IEEE, p. 884, 1990.

3Com, "Access Builder Family Remote Access Servers", 1995.

*Primary Examiner*—Parshotam S. Lall
*Assistant Examiner*—Andrew Caldwell
*Attorney, Agent, or Firm*—Mark A. Haynes; Wilson, Sonsini, Goodrich & Rosati

[57] ABSTRACT

A communication server includes one or more ISDN ports or other wide area network ports, one or more local area network ports, a plurality of processors and data channel resources which execute a process for distributing data channel signal processing among the plurality of processors. The process includes maintaining resource information for a set of processors on the communication server, the resource information concerning levels of utilization of processors in said set of processors; detecting, in processors corresponding to particular input/output ports of the server, activity in data channels through input/output ports managed by the processors; sending requests in response to the detected activity from the corresponding processors to a managing processor on the communication server, said requests identifying compression or decompression services needed for the detected activity; selecting in the managing processor in response to the resource information and the request, service processors from the set of processors in the server to provide compression or decompression services identified in the request for the detected activity on the data channel; and routing the detected activity on the data channels to the selected service processors.

42 Claims, 18 Drawing Sheets

DISTRIBUTED SIGNAL PROCESSING FOR DATA CHANNELS MAINTAINING CHANNEL BANDWIDTH

BACKGROUND OF THE INVENTION

1. Field of the Invention

The present invention relates to techniques of managing signal processing on data channels, such as compression and decompression; and more particularly to systems in which such signaling processing resources are distributed among plural processors.

2. Description of Related Art

A variety of technologies are used for encoding and decoding data in data channels for communicating between data processing systems. For example, compression and decompression technology are becoming standard for wide area network WAN systems, such as integrated service digital networks ISDN.

As the number and bandwidth of data channels handled by a particular processing system increases, the overhead involved in the compression and decompression algorithms can be quite significant.

In one prior art system, known as the Access Builder Remote Access Server, available from 3Com Corporation in Santa Clara, Calif., a number of input/output cards are coupled to a communication server which has a central processor. The compression and decompression services are provided by the central processor as a side job to the management of communications processes in the data channels, which is handled by processors on the input/output cards themselves. Thus, when one of the data channels needs compression or decompression service, it requests that service from the central processor, which allocates the memory and resources necessary to perform the job, and then reports back to the processor on the input/output card managing the data channel when the job is completed. With a large number of data channels, the compression and decompression resources in the central processor can be overwhelmed. If the resources are not available when needed by a particular data channel, then the data channel gets disconnected, slowing down the communication process. Therefore, a need exists for a system which better manages the utilization of processing resources to accomplish encoding and decoding services on high bandwidth data channels, particularly in communication server, which interface to several input/output ports.

SUMMARY OF THE INVENTION

The present invention provides a data processing system that manages signal processing on data channels, comprising a management resource that distributes the data compression and decompression tasks or other encoding and decoding tasks among multiple processors in the system. The central management resource is able to optimize utilization of signal processing resources among the plurality of processors in the system, and ensure that more data channels are handled more efficiently.

The present invention can be characterized as a process executed in a data processing system that includes a plurality of processors and at least one input/output port. The method manages the signal processing for data channels using the input/output port, based on providing a management resource for signal processing services distributed in the plurality of processors. Signal processing services are requested on behalf of a channel by signalling the management resource in response to activity on a particular data channel. The management resource selects in response, one of the plurality of processors as a service processor for the particular data channel on which the activity is detected. Then, the management resource routes the activity on the data channel through the service processor for use of the signal processing resources of that service processor. According to the present invention, the service processor may not be the same as the processor managing the communication function for the data channel.

In the step of selecting one of the plurality of processors as a service processor, the management resource monitors utilization of resources in the plurality of processors. Based on the type of signal processing requested, and the level of utilization of resources in the plurality of processors, the management resource is capable of routing the activity to a processor which is available to handle the particular data channel.

According to one aspect of the invention, the plurality of processors includes processors located on input/output cards in a communication server. The management resource monitors utilization of the processors on the input/output cards, by executing steps including determining whether input/output ports on the respective cards are busy, and determining whether processors located at particular input/output cards have resources for the type of service needed for a particular data channel.

According to another aspect of the invention, the processor handling the data channel at a particular input/output port requests services from the management resource. The requests issued by the processor include information about the type of signal processing resources needed, the bandwidth of the data channel, and a function to be executed upon completion of signal processing services on the data channel. The data channel is routed to a processor among the plurality of processors, including potentially the processor managing the channel itself, or a processor on a completely different input/output card, based on the availability of resources, the bandwidth of the data channel. On completion of the signal processing service at the selected processor, the task specified in the request is executed, and the processor managing the data channel is notified that the task requested has been completed.

As mentioned above, the present invention is particularly suited to management of compression and decompression resources in communication servers. Thus, each of the input/output processors on a communication server can be configured to handle a compression and decompression algorithm, such as the "Stacker" algorithm available from Stac Electronics, Inc. This algorithm involves establishment of history tables for each data channel being handled. Input/output processors in the system have a limited memory, such that only a limited number of history tables can be established in each processor. The present invention is also applicable to other signalling processing services, such as encryption and decryption, and other encoding and decoding services necessary for execution on data channels.

In the communication server environment, the present invention can be characterized as a method including the steps of:

maintaining resource information for a set of processors on a communication server, the resource information concerning levels of utilization of processors in said set of processors;

detecting, in processors corresponding to particular input/output ports of the server, activity in data channels through input/output ports managed by the processors;

sending requests in response to the detected activity from the corresponding processors to a managing processor on the communication server, said requests identifying compression or decompression services needed for the detected activity;

selecting in the managing processor in response to the resource information and the request, service processors from the set of processors in the server to provide compression or decompression services identified in the request for the detected activity on the data channels; and routing the detected activity on the data channels to the selected service processors.

The resource information is maintained in a table by the managing processor, indicating an available bandwidth, a level of utilization of the processor, and other information about each processor on the server. The step of routing is based on establishing a table for client channels indicating the service processors for the channel and other parameters associated with routing the activity, including a process to be executed upon completion of the compression or decompression service on a particular activity on the channel.

According to one aspect of the invention, the method described above is executed in a communication server having one or more ISDN ports or other wide area network ports coupled to the server. Furthermore, the server may include one or more local area network ports through which the data channels may be routed.

The present invention can also be characterized as a communication server including a plurality of ports, a plurality of processors and data channel resources which execute the process as discussed above. According to a further aspect of the invention, the communication server is based on a shared memory architecture, in which the input/output device and a central processor communicate among one another using the shared memory.

Utilizing the processes and architecture of the present invention, a communication server is provided in which a system CPU distributes and manages the data compression and decompression tasks among peripheral CPUs located on the input/output cards of the system. Because of the centralized management of resources, it is possible to maximize utilization of the available processing power in the communication server so that a minimum number of data channels is disconnected due to unavailability of required signal processing services.

Other aspects and advantages of the present invention can be seen upon review of the figures, the detailed description and the claims which follow.

DETAILED DESCRIPTION

Figure 1:
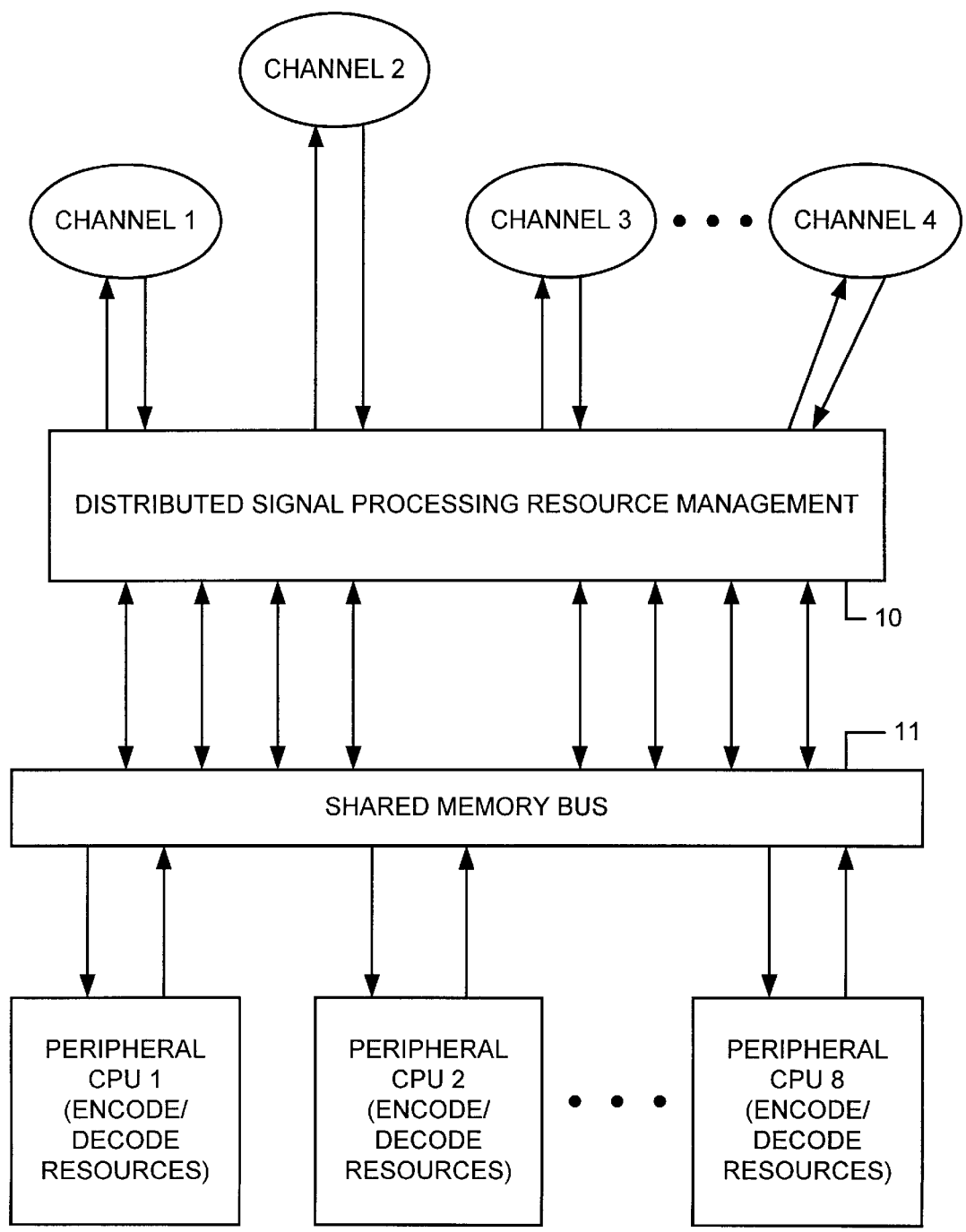
FIG. 1 is a functional block diagram of a distributed signal processing system according to the present invention.
Figure 2:
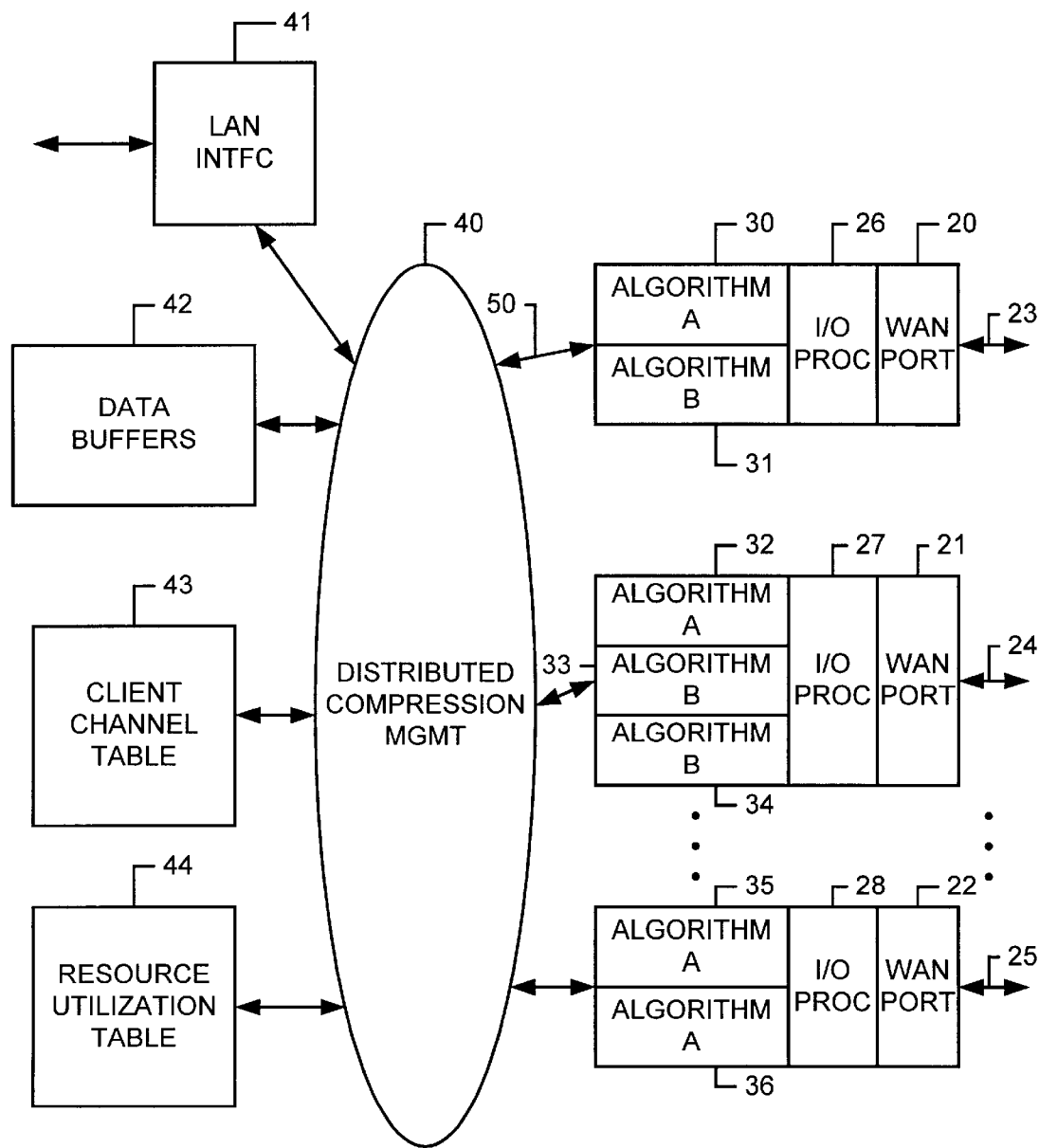
FIG. 2 is a functional diagram of a distributed compression management system in a communication server according to the present invention.

A detailed description of embodiments of the present invention is provided with respect to the figures, in which FIGS. 1 and 2 provide a perspective of the present invention, and FIGS. 3–19 illustrate a particular embodiment.

As shown in FIG. 1, a distributed signal processing resource management unit 10, is coupled to plurality data channels, channel 1, channel 2, channel 3, . . . , channel 16. Each of the data channels constitutes a logical session which is being conducted through at least one input/output port on the device with a remote unit. Thus, each session has unique requirements for signal processing resources. The channels illustrated in the figure are coupled to the distributed signal processing management unit 10 through at least one input/output port on the device. The unit 10 is coupled to a shared memory bus 11, or other communication backbone, which in turn is coupled to a plurality of peripheral processors including CPU 1, CPU 2, to CPU 8, as shown in the figure. In other systems, the communication backbone may comprise a local area network or other communication medium. Encode and decode resources are associated with each of these peripheral CPUs to provide encoding and decoding services to the data channels, channels 1–16.

The encode/decode resources located in the peripheral CPUs can be compression and decompression resources, encryption and decryption resources, or other signal processing resources required to service the data channels. When a channel, such as channel 1 indicates to the distributed signal processing resource management unit 10 that services are required, the resource management unit 10 selects one of the peripheral CPUs to the provide the services, depending on the levels of utilization of the peripheral CPUs, the resources available on the CPUs, the type of service required by the channel, and the bandwidth of the channel. This dynamic routing of channels to resources for encoding and decoding data in the channel is facilitated by utilization of the shared memory bus 1, such that the data from the channel is relayed into a shared memory, and control signals are generated by the resource management unit 10 to signal the peripheral CPUs of the presence of data to be processed, and of the actions to be taken upon completion of processing.

In the figure, there are 8 CPUs and 16 channels shown. In this configuration, if each CPU is capable of handling the signal processing needs of two channels, then all 16 channels would be serviced adequately by the system.

Because of the dynamic nature of the opening and closing of data channels in a communications environment, the dynamic allocation of resources among the peripheral CPUs according to the resource management unit 10 of the present invention, optimizes utilization of the processing resources, and allows the system to maintain a larger number of channels with fewer dropped channels than is possible in prior art systems.

FIG. 2 provides a functional diagram of a communications server implemented according to the present invention. The communications server according to the present invention, includes a plurality of I/O ports, including wide area network WAN port 20, WAN port 21, and WAN port 22. Each of the WAN ports 20–22 is coupled to a communication medium represented by the arrows 23, 24, and 25.

Coupled to each of the WAN ports 20–22 are respective I/O processors, 26, 27, and 28, which manage a corresponding WAN ports 20, 21, 22. The management of the WAN port includes the opening, maintenance and closing of data channels through the port, depending on a particular communication protocol of the port. According to the present invention, also coupled with I/O processors 26, 27, 28 are resources for providing signal processing on the data channels, such as compression and decompression resources. Thus, as illustrated in FIG. 2, coupled to I/O processor 26 are resources 30 for providing compression and decompression services according to a first algorithm, algorithm A, and resources 31, for providing compression and decompression services on a data channel according to a second algorithm, algorithm B.

I/O processor 27 is configured to support three data channels, including resources 32 which operate according to algorithm A, resources 33 which operate according to algorithm B, and resources 34 which operate according to algorithm B. Thus, two channels operating according to algorithm B and one channel according to algorithm A can be serviced using the resources of I/O processor 27.

I/O processor 28 as shown in FIG. 2 includes resources 35 operating according to algorithm A, and resources 36 also operating according to algorithm A, which provide compression and decompression resources for respective data channels.

Coupled to each of the I/O processors 26, 27, 28, is a distributed compression management resource 40. This resource 40 may be executed by one of the I/O processors, or in a preferred system, executed in a central management processor on the communication server.

A local area network interface 41 is also coupled to the distributed compression management unit 40, as shown in the figure. Data buffers 42 provide data storage for utilization by the distributed compression management system. The distributed compression management unit 40 maintains a client channel table 43, which maps active channels to specific resources in the I/O processors. Also, the distributed compression management unit 40 maintains a resource utilization table 44, which indicates resources available in the system for the distributed compression management unit 40.

In operation, when an I/O processor, such as processor 26, establishes a data channel through its I/O port 20, it determines whether compression resources are required. If compression resources are required, then a request for such resources is issued across line 50 to the distributed compression management unit 40. The distributed compression management unit 40 routes the data channel to one of the plurality of I/O processors 26, 27, 28, which have resources available to provide the requested services. The routing decision is made by management of the client channel table 43 and the resource utilization table 44, which indicate the number of established channels, and the available resources on the I/O processors. When services are completed for a particular channel, according to the selected algorithm, the distributed compression management unit 40 provides a mechanism for returning the processed data to the I/O processor managing the channel, as necessary.

Figure 3:
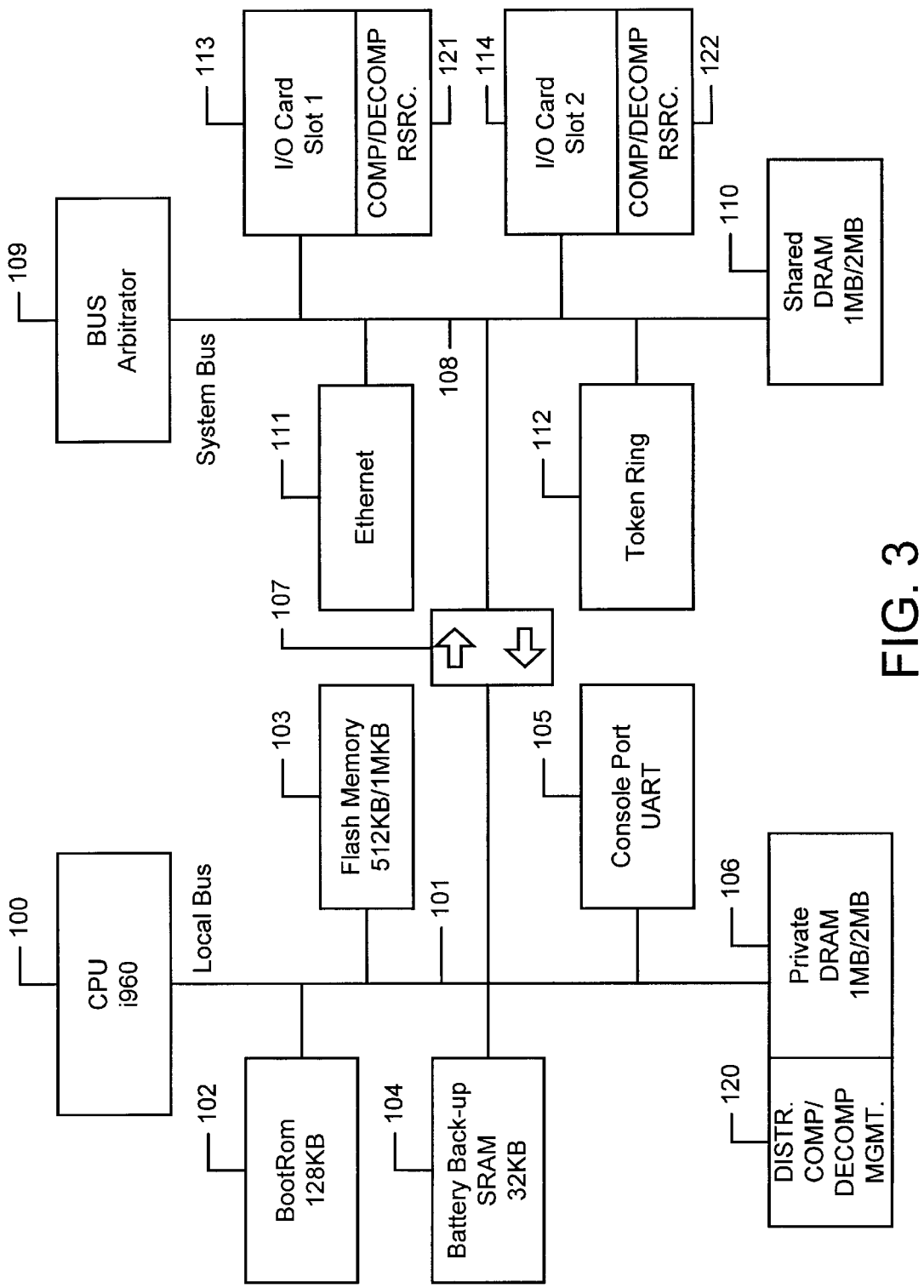
FIG. 3 is a block diagram of a hardware architecture of a communication server according to the present invention.

FIG. 3 illustrates a hardware architecture for a communication server which includes resources such as those illustrated in FIG. 2. Thus, a communication server architecture includes a managing CPU 100, in this example using an Intel 80960 RISC processor, coupled to a local bus 101. Coupled to the local bus are a boot ROM 102, a flash memory 103, a battery backup SRAM 104, a console port 105, and a private dynamic RAM memory 106.

The boot ROM 102 is implemented using an EPROM. The flash memory 103 is utilized for remote download program storage, and for other services. The battery backup SRAM is utilized for parameter storage for the management processor 100. The private DRAM 106 is utilized for program execution and data storage privately by the management CPU 100. A system bus interface 107 separates the CPU local bus 101 from the system bus 108 which is shared by the CPU 100 and the peripherals carrying user traffic.

The system bus 108 is coupled to a bus arbiter 109 and to a shared dynamic RAM 110. Also coupled to the system bus 108 are a plurality of input/output cards, including an ETHERNET interface 111, a token ring interface 112, and a plurality of input/output card slots 113 and 114. In this embodiment, there are two input/output card slots implemented. Input/output card slots are adapted for wide area network ports, to provide access to the local area networks 111 and 112 across the wide area networks.

The bus arbiter 109 on the system bus provides that each peripheral device can be a bus master, a bus slave, or both. As a bus slave, a peripheral responds to the read/write command from the CPU 100. This mode is typically employed by the CPU to configure each peripheral device.

An I/O card can also be a bus master. I/O cards in the slots 113 and 114 share the system bus bandwidth through the bus arbiter 109. All of the I/O cards in the slots 113 and 114, as well as the interfaces 111 and 112, can communicate with the CPU 100 through the shared memory 110. To simplify the communications traffic, in a preferred system, the ETHERNET, and token ring interfaces 111, 112, and two I/O cards in slots 113, 114 do not communicate directly with one another.

According to the present invention, the distributed compression/decompression management unit is implemented primarily with computer software 120 stored in the private DRAM 106. Also, each of the I/O cards, coupled to the I/O card slots 114 and 113, include compression and decompression resources 121 and 122, respectively.

Figure 4:
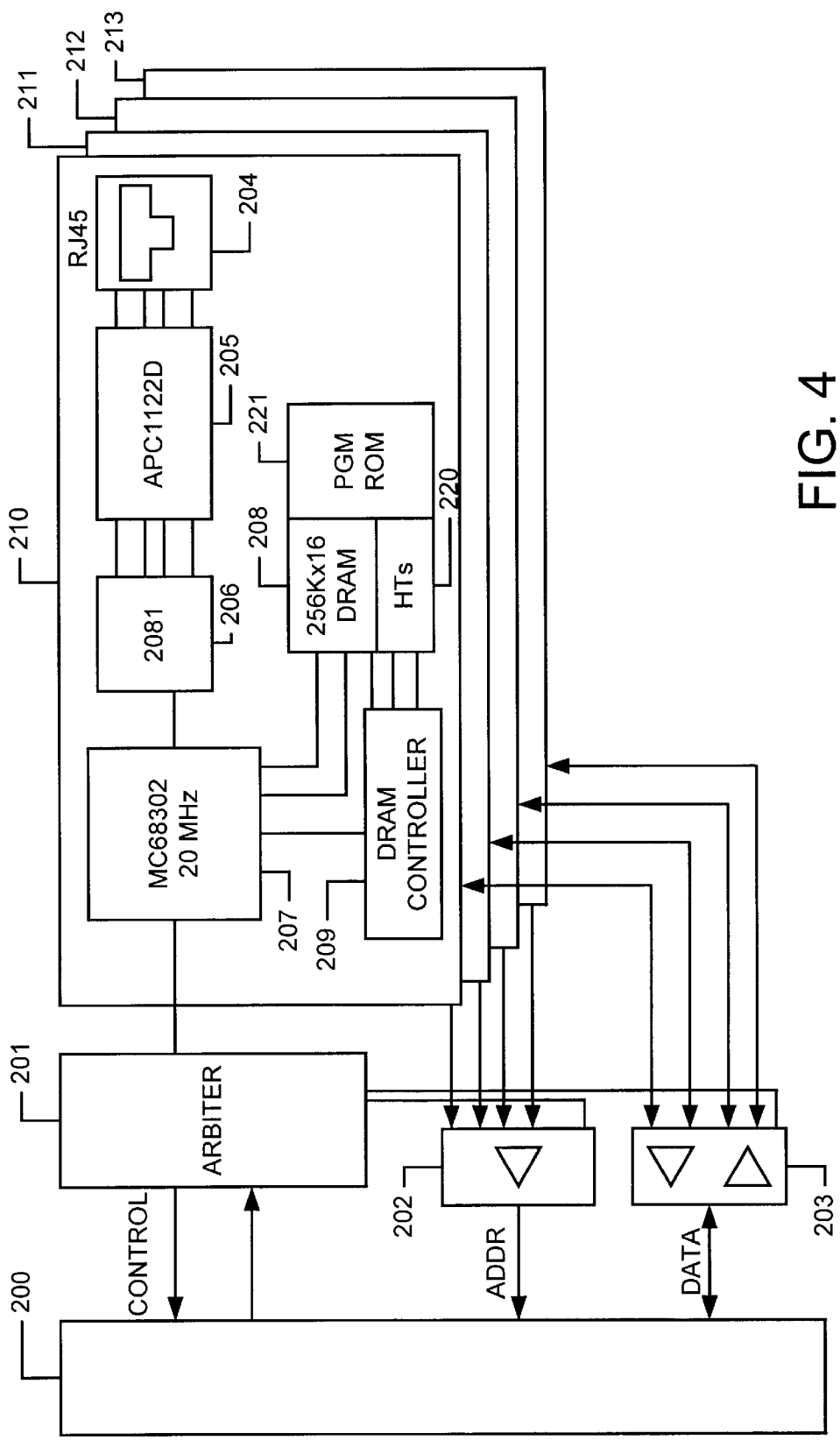
FIG. 4 is a schematic diagram of the hardware architecture of an input/output card for use with the system of FIG. 3.

FIG. 4 illustrates the architecture of an intelligent peripheral I/O card which supports four ISDN ports. The intelligent peripheral includes a bus interface 200 which is coupled to bus arbiter logic 201. An address driver 202 and a data buffer 203 are coupled to the bus interface 200. Each port includes an RJ45 jack 204, coupled to a S/T line interface module 205 such as an APC 1122D, Advanced Power Components Ltd. of the United Kingdom, and a S/T interface integrated circuit 206, such as the Siemens 2081. The port is managed by an I/O processor 207, which has local DRAM memory 208 and a DRAM controller 209 coupled thereto. There are four ports, including port 210, port 211, port 212, and port 213 which share the bus interface 200.

Thus, the peripheral card includes four independent ISDN communication blocks 210 through 213, which have access to a common shared memory DRAM 110 on the system bus of the architecture of FIG. 3. Each of the four independent ports 210 through 214 is managed by a separate processor complex, based in the example on the Motorola MC68302 processor. The processor 207 serves as the main controller for the port, directing serial data through its serial ports and sending messages and data to the host system.

The S/T bus interface controller 206 implements a four-wire S/T interface used to link voice and data ISDN terminals, network terminators and PABX trunk lines to a central office. Through selection of operating modes, the device may be used in all types of applications involving a S/T interface.

The S/T line interface 205 integrates the magnetic and passive components needed to attach the bus interface controller 206 to the ISDN S/T reference line through the RJ45 port 204.

The shared memory arbiter 201 on the intelligent peripheral interfaces the local buses of the four processor complexes on the ports 210–213, to the system bus 108 of the communications server. Arbitration in one embodiment is decided in a round-robin fashion with the last port that is granted access to the bus being given lowest priority.

Also included in the processor complex, is a local program memory 221 which stores programs for executing compression and decompression algorithms according to the present invention. Furthermore, the DRAM 208 in each processor complex, stores the history tables 220 and provides other memory resources utilized by the compression and decompression algorithms supported by the processor complex.

The processor complex on each port operates as the core microprocessor attached to the peripheral and support logic through the system bus. These processors manage the communication channels established through the corresponding ports, including the control of various parameters and counters and memory buffer descriptor tables required for the establishment of the data channels. These parameters, counters, and buffer descriptor tables may reside in the local DRAM 208 or be written to the off chip system memory 110 (shown in FIG. 3). Furthermore, the processor complex 207 supports the DMA channels for the required data transfer to support channel traffic.

When compression or decompression resources are required by a particular channel, then the processor complex 207 on the particular port issues a request for such services to the managing CPU 100 in the system of FIG. 3.

Thus, the processor complex 207 provides for the management of data channels on local I/O ports, as well as providing signal processing resources for data in channels handled by the systems. According to the present invention, the data processing resources, such as the programs which execute compression and decompression algorithms, and the memory resources, utilized for history tables or other resources needed for a particular algorithm, are located in the processor complex 207 on the intelligent peripherals. However, these resources are not necessarily utilized by the channels on the same ports that are managed by the processor complex 207. Rather, these resources are allocated using a centralized management program executed by the management processor 100 in the system of FIG. 3, in order to optimize the utilization of processor resources on the peripheral devices, and ensure the maximum number of channels can be supported at any one time by the communication server.

FIGS. 5–19 are flowcharts illustrating processes executed to perform the functions of the present invention. Data structures used by these functions are outlined next, followed by a description of the functions. These functions utilize three main data structures, including a channel client table and a resource table maintained by the management processor 100, and up to two history tables per processor complex in the I/O cards maintained locally on the I/O cards.

The resource table includes information about the level of utilization of the processors on the I/O cards. The resource table includes one instance for each processor complex, or eight entries in a fully loaded system, indicating the level of utilization of the corresponding processor. In the embodiment being described, each processor is capable of handling two compression and decompression sessions. For each processor instance, there are two entries identifying compression/decompression sessions being handled by the processors. Each of these entries includes a sequence ID, indicating the transaction being handled, and a client ID indicating an entry in the client table which corresponds to the particular session being handled. Each of the entries includes a flag indicating whether the session is currently in use or not. Furthermore, for each CPU, the resource table maintains an entry indicating whether or not the CPU is alive or not on the system. The next entry in the resource table indicates available bandwidth for the compression and decompression resources on the CPU. Thus, in the example being described, each sequence is capable of handling a bandwidth of 128 kilobytes per second in sets of 64 kilobytes each. Thus, the available bandwidth is indicated by the number of 64 kilobyte clients being processed in the two sessions in the device. If there are no sessions current, then there are 128 kilobytes of bandwidth available. If there is one session available, then that session either consumes 64 kilobytes or 128 kilobytes according to this embodiment. If there are two sessions, then each session must be consume 64 kilobytes of bandwidth. Finally, each entry in the resource table includes an indication of the number of packets outstanding per CPU. In this embodiment, there is a maximum of three packets that can be outstanding at any given time by the particular CPU. An outstanding packet is a packet subject of the compression or decompression resources in either of the two sessions handled by the CPU.

The client table includes for this embodiment 16 instances, two for each of the CPUs active in the system. Each instance of the client table indicates the following parameters:

1. Whether the entry is used or not. The first parameter indicates whether or not the entry is used. If there are fewer than 8 interactive processors, then all 16 entries in the client table may not be used.
2. The slot of the I/O card for the CPU utilizing this entry.
3. The CPU on the I/O card utilizing this entry.
4. A pointer to the history table for the session using this entry.
5. A mode indicator, indicating whether a so-called packet mode or so-called history mode is being utilized. In the packet mode, the history table is reset for each packet which is processed. In the history mode, the history table is reset to in response to communications across the data channel.
6. A tag indicating whether the current entry is active.
7. A parameter indicating the bandwidth utilized by this client, either 64 kilobytes or 128 kilobytes in the embodiment being described.
8. A pointer to a function to call when the requested service is completed.

The client table may store other parameters, including parameters indicating certain characteristics of the data channel. For instance, a maximum packet length may be included which is sent to the compression CPU for comparison with the results of the compression algorithm. If the result is bigger than a maximum packet size, then the compressed data is not returned, as it cannot fit within that packet. As an example, standard ETHERNET packets are about 1,500 bytes. If a packet is processed by a compression CPU and turns out longer than 1,500 bytes, then it may not be desirable to utilize the compressed version of the packet.

As mentioned above, in the preferred system, the compression and decompression algorithms executed the so-called Stacker algorithm available from Stac Electronics, Inc., which are based on a history table. The history tables store a map of codes, followed with patterns from the data channels which are allocated to the codes in the map. The history tables are pre-allocated to about 14 kilobytes of memory space. These history tables in the embodiment being described are stored locally on the processor complexes in the I/O cards.

The processes executed according to the present invention, can be understood with reference to a specific example described with reference to FIGS. 5–19.

Figure 5:
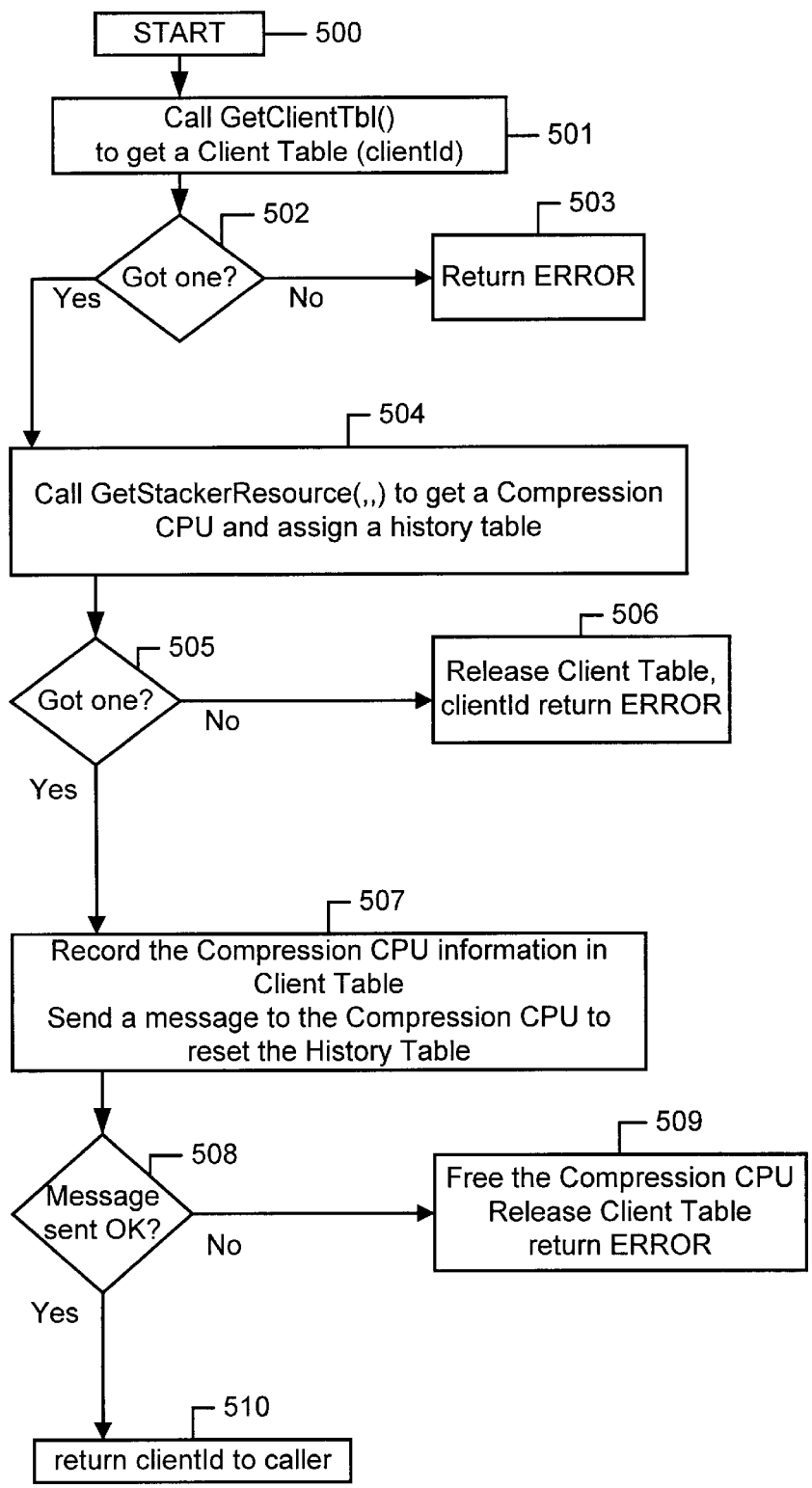
FIG. 5 is a flowchart illustrating a request for compression or decompression services by a channel for the system of FIG. 3.

The following interface functions are created:
1. CPI_OpenAccount (FIG. 5)

Client specifies the bandwidth requirement for this session. It first gets an entry in a new Client Table. It then scans a new resource table to look for an I/O processor that has required. Each I/O processor has an entry in the Resource Table. If the required bandwidth is found, and the compression CPU is alive, a history table is assigned. If no I/O processor has the required bandwidth, an error is returned. It records the slot/cpu number of the I/O processor picked, the assigned history tables and the bandwidth allocated in the client table. There are 16 entries in the client table, allowing a maximum of 16 clients.

Messages are then sent to the I/O processor to reset the history tables.

Figure 7:
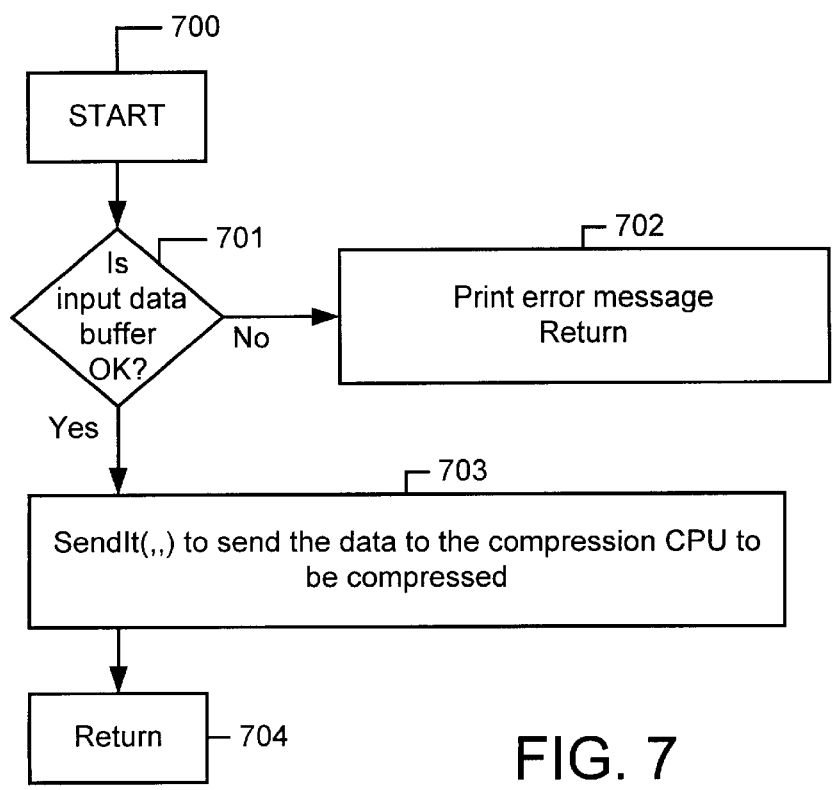
FIG. 7 is a flowchart of a procedure executed by a channel to have data compressed in the system of FIG. 3.

The table index is returned as the Client ID.
2. CPI_Compress (FIG. 7)

Figure 8:
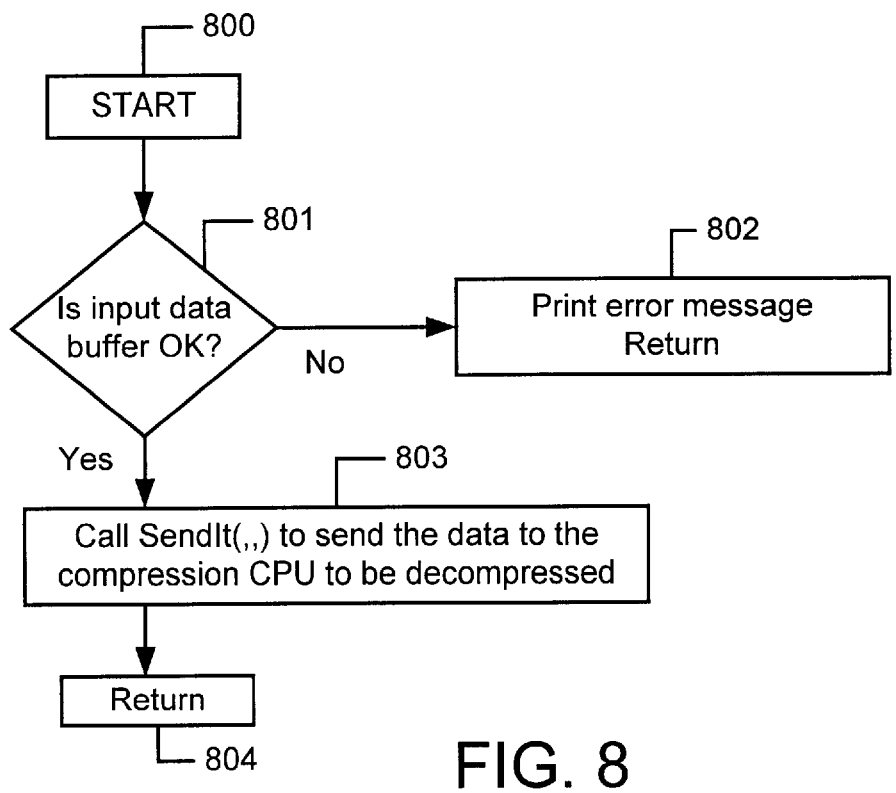
FIG. 8 is a flowchart of a procedure called by a client to have data decompressed in the system of FIG. 3.

Client puts the data to be compressed in a buffer data BD chain in shared memory, and calls this function. The arguments are:
ClientID
BD pointer
Parameter to return the above function is called It fills the user area of the BD, and sends a message to the compression CPU
3. CPI_DeCompress (FIG. 8)

Figure 9:
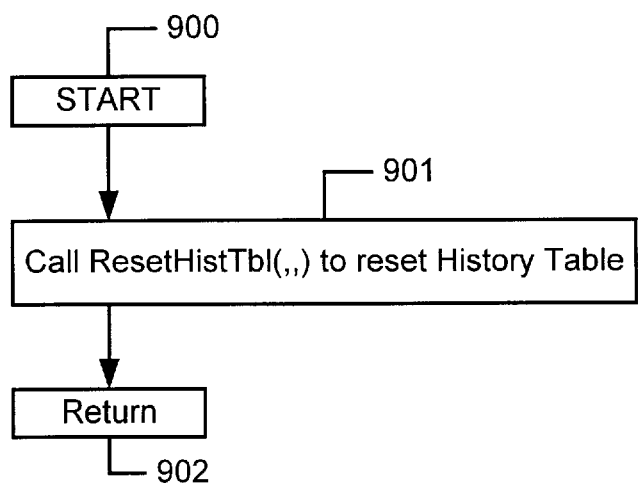
FIG. 9 is procedure called by a client to reset a compression history table for the channel.

Client puts the data to be decompressed in a BD chain, and calls this function. The arguments are:
ClientID
BD pointer
Parameter to return the above function is called It fills the user area of the BD, and sent a message to the 68302.
4. CPI_ResetCompressHist (FIG. 9)

Client calls this procedure to reset the compression history table. Client ID is the argument. It fills the user area of the BD, and sent a message to the compression CPU.
5. CPI_ResetDeCompressHist (FIG. 9)

Figure 6:
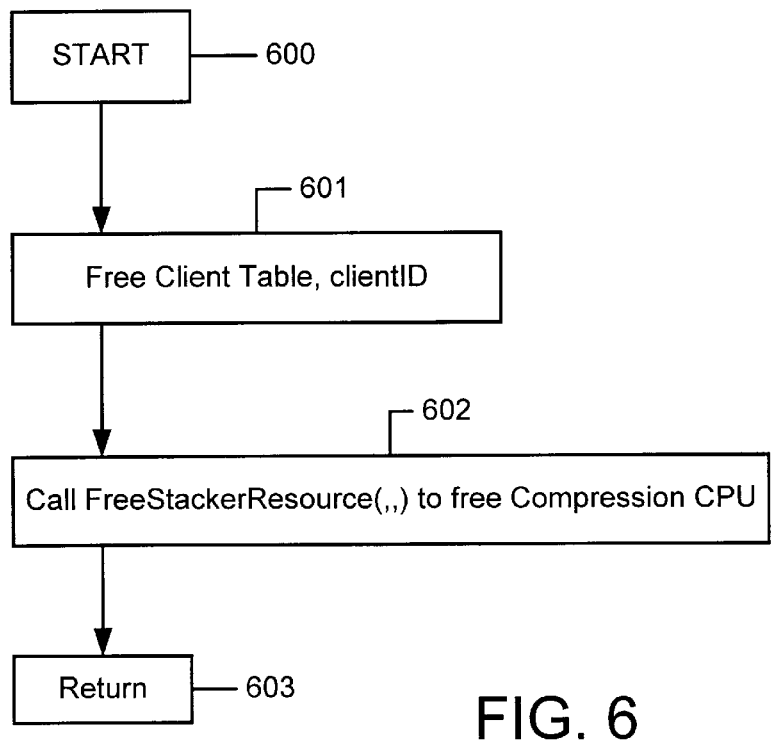
FIG. 6 is a flow chart of a procedure for closing a channel account with the distributed management resource to the present invention.

Client calls this procedure to reset the decompression history table. Client ID is the argument. It fills the user area of the BD, and sent a message to the compression CPU.
6. CPI_CloseAccount (FIG. 6)

Figure 12:
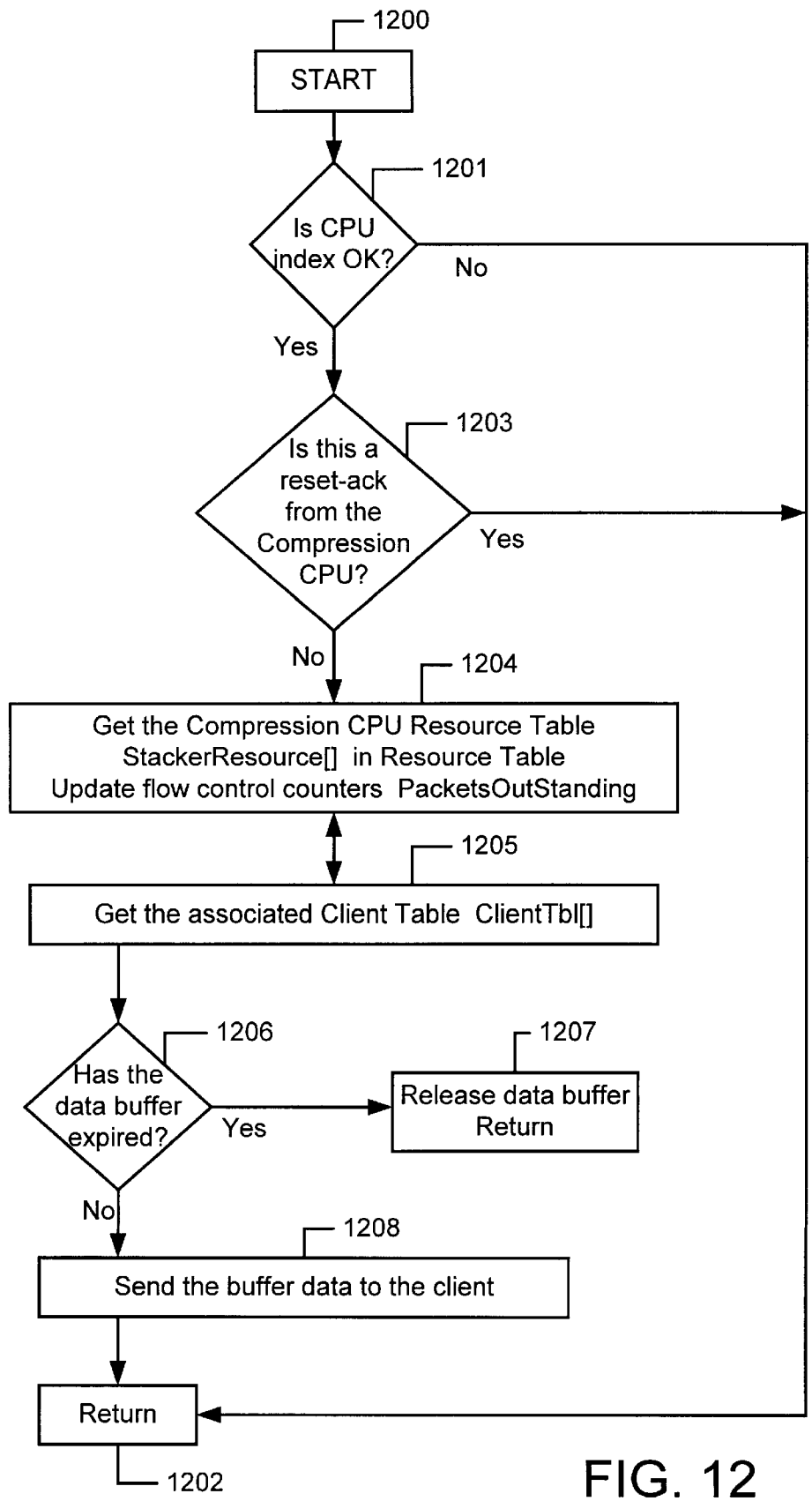
FIG. 12 is a flowchart of a procedure executed upon completion of the compression or decompression services by the servicing CPU in the system of FIG. 3.

Client calls this function to free up the resource. Client ID is the argument. It cleans the ResourceTable and the ClientTable.
7. DataCompression (FIG. 12)

Figure 10:
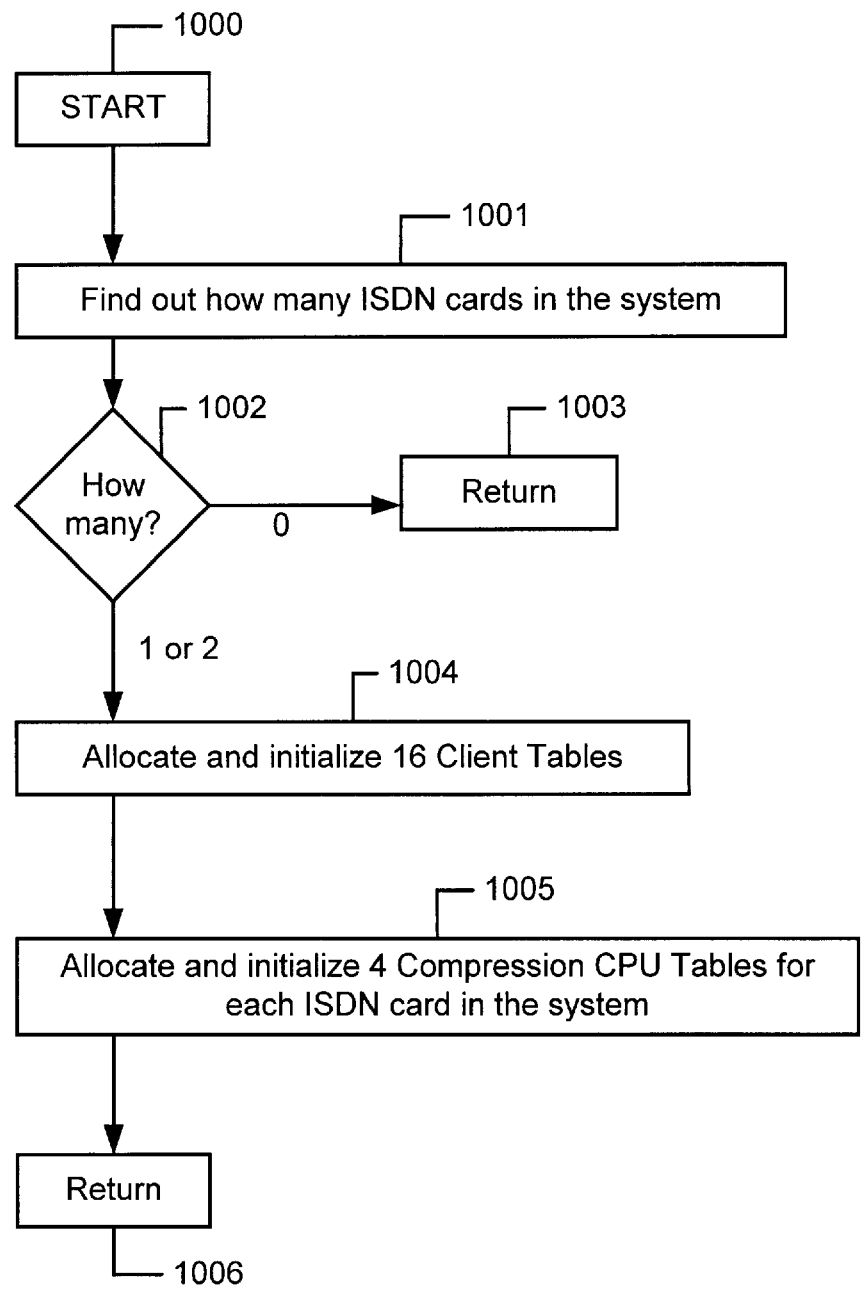
FIG. 10 is a flowchart of the procedure used to initialize the data structure for the distributed compression and decompression processes on the system CPU according to the present invention.

Called from the channel driver when the compression CPU indicates that the (de)compression has been done. It uses the slot number and CPU number returned by the channel driver to index into the Resource Table, which contains the client table index. The return function specified by the client is then called.
8. CPI_ProcInit (FIG. 10)

Figure 19:
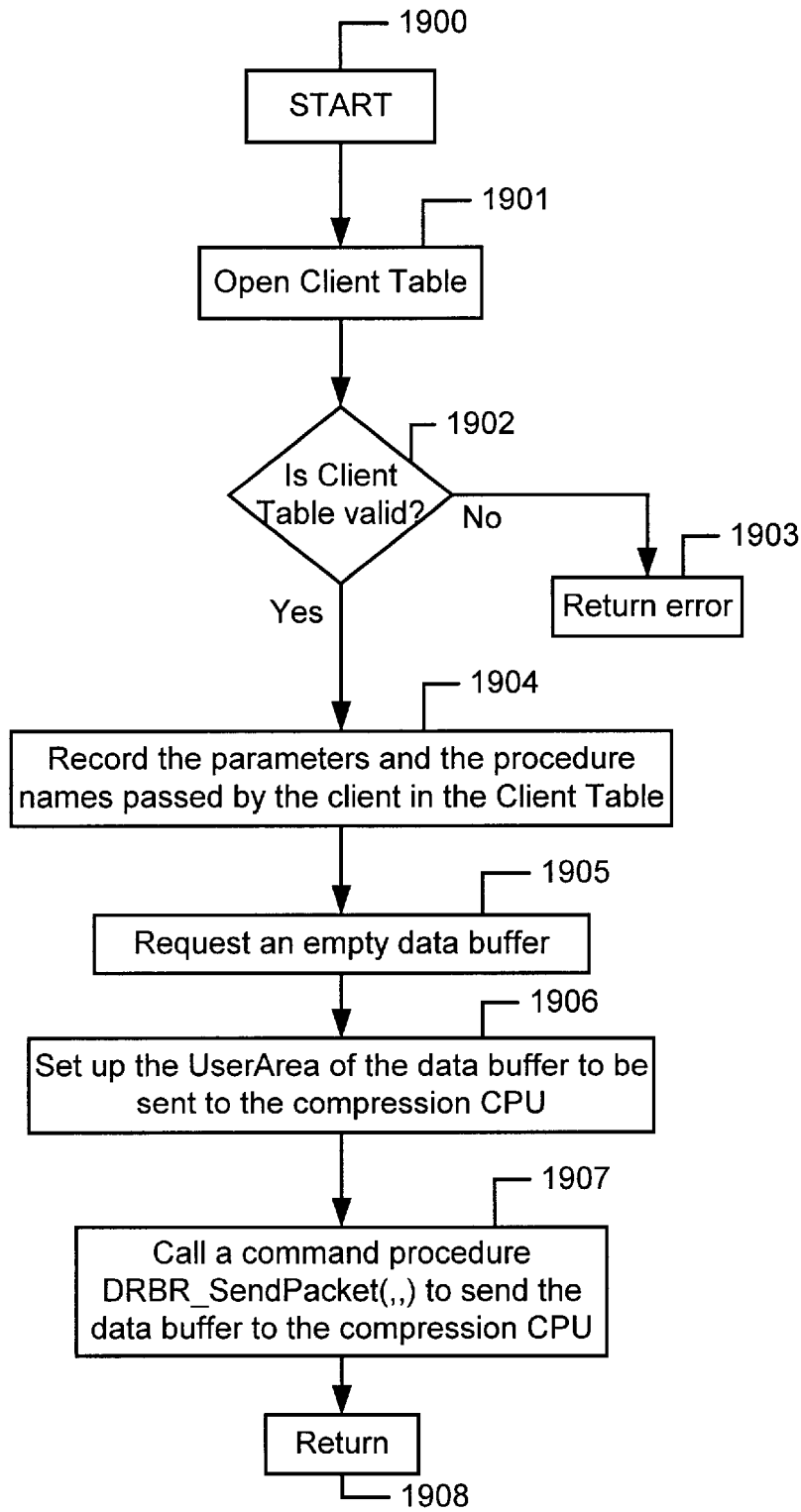
FIG. 19 is a process called by a client channel to inform the services processor of which procedure to call when a data buffer has been processed by the compression CPU in the system of FIG. 3.

Called to allocate and initialize the ResourceTable and the ClientTable.
9. CPI_RegisterCallBack (FIG. 19)

Client calls this function to register the function name to call when the (de)compression is done.

Thus, FIG. 5 illustrates the process executed when service is requested by a data channel. This is the first procedure to call to register a service. In response to this procedure, a compression resource is allocated from the compression resource table and an identifier from the client table is provided. The process returns an error if no resource, either no compression resource or no client table entry is available. The process returns a client identifier if a compression CPU is assigned. This identifier is utilized for all subsequent services such as compression of data requested by the client. Thus, the process begins at block 500. The remote processor calls a function (FIG. 16) to get an identifier for the client table entry to be allocated to this data channel (block 501). Next, the algorithm determines whether a client table identifier was returned (block 502). If not, then an error is returned (block 503). If an identifier was returned, then the data channel calls a get resource algorithm (FIGS. 15A–15C) to return a compression CPU and assign a history table for the data channel (block 504). Next, the algorithm determines whether resources were assigned to the channel (block 505). If not, then the client table identifier is released and an error is returned (block 506). If resources were assigned, then the compression CPU information is stored in the client table, and a message is sent to the compression CPU to reset the allocated history table (block 507). Next, it is determined whether the message sent was successfully received (block 508). If not, then the compression CPU is released, the client table is released, and an error is returned (block 509). If the message was successfully returned, then the client ID is returned to the data channel (block 510).

FIG. 6 illustrates a process which is called by a client when the compression service is no longer needed (starting at block 600). The first step is to free the client table entry (601). Then, the compression CPU is free by the process of FIG. 13 (block 602), and the algorithm is done (block 603).

FIG. 7 illustrates the process called by a client to have data in a data buffer compressed. Thus, once data has been transferred through the data channel into the data buffer, the client managing the channel starts this procedure (block 700). First, it determines whether the data in the buffer is valid (block 701). If not, then an error is returned (block 702). If the data is valid, then the management process calls a process (FIG. 17) to send the data to the compression CPU to be compressed (block 703). Finally, this algorithm is finished (block 704).

Figure 17:
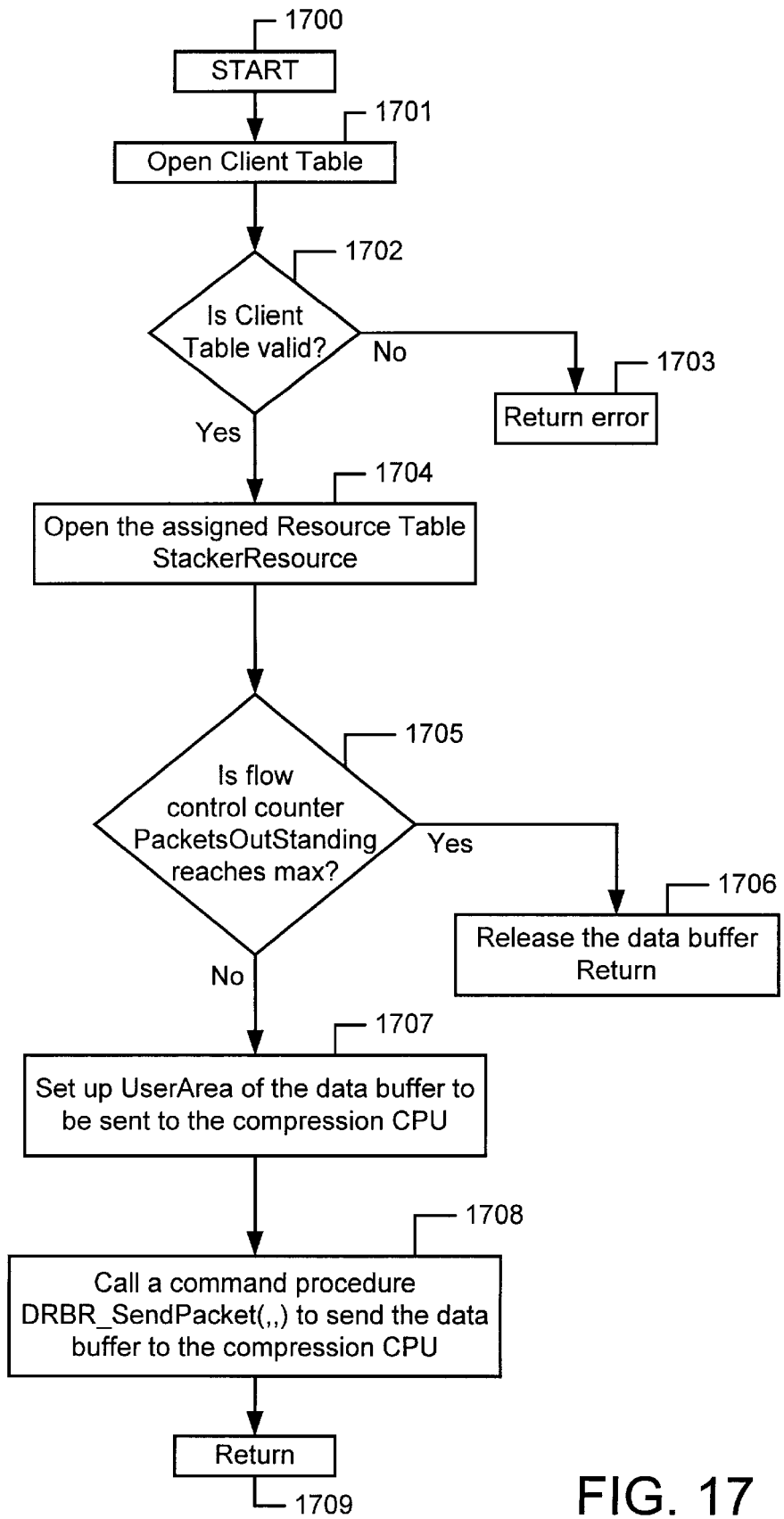
FIG. 17 is a flowchart of a procedure utilized to send a data buffer to a service CPU in the system of FIG. 3.

FIG. 8 illustrates the process called by a client to have data in the data buffer decompressed. This process is basically identical to that of FIG. 7, and starts at block 800 when a data packet from a data channel has been received by the processor. The algorithm first determines whether the data is successfully stored in the data buffer (block 801). If not, then the error is returned (block 802). If the input data buffer is valid, then the routine of FIG. 17 is executed (block 803) for the data to be decompressed. Finally, the process is completed (block 804).

FIG. 9 illustrates the process executed by the client to reset a compression history table which resides in the compression CPU's private memory. The algorithm starts at block 900. The client calls the reset history table process (FIG. 18) (block 901) and returns (block 902). A similar process (not described) is used to reset a decompression history table.

FIG. 10 illustrates the process called by the management CPU during system bootup to initialize the data structures for the compression and decompression processes on the system CPU. The algorithm begins at block 1000 at system bootup. First, it determines how many I/O cards are attached to the system (block 1001). If, it is determined at block 1002 that no cards are connected, then the algorithm returns to block 1003. If one or two cards are found, then the 16 client table entries are allocated and initialized (block 1004). Next, the code allocates and initializes four compression CPU resource tables for each ISDN card found in the system (block 1005). After step 1005, the algorithm is finished (block 1006).

Figure 11:
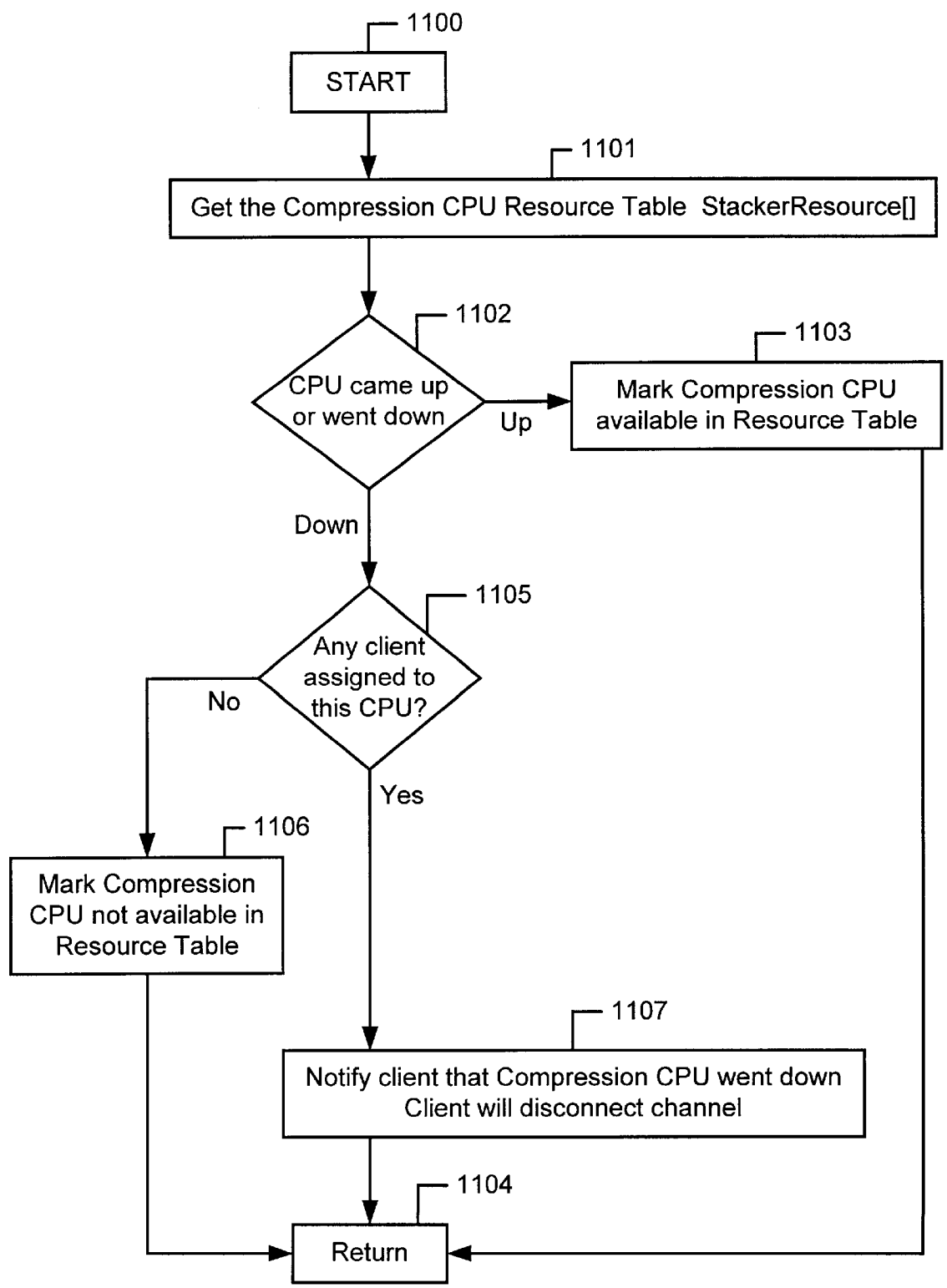
FIG. 11 is a flowchart of the procedure called to report CPU status in the system of FIG. 3.

FIG. 11 illustrates the process executed to determine the status of a compression CPU in the system. The process begins at block 1100. The first step is to get the compression resource table for a particular CPU (block 1101). The algorithm determines whether the CPU status is up or down (block 1102). If the status is up, then the compression CPU is marked available in the resource table (block 1103), and the algorithm is done (block 1104). The CPU is down at block 1102, and the algorithm determines whether any client has been assigned to this CPU (block 1105). If not, then the compression is marked not available in the resource table (block 1106) and the algorithm returns (block 1104). If a client had been assigned to this CPU, then the client is notified that the compression CPU is down. This causes the client to disconnect the channel (block 1107). After block 1107, the algorithm is completed (block 1104).

FIG. 12 illustrates the process executed after a data buffer has been compressed or decompressed by the allocated compression CPU. The algorithm begins at block 1200 after a control signal from a compression CPU. Next it proceeds to determine whether the CPU index (slot number/CPU number on the slot) is in valid range. (block 1201). If the CPU index is not valid, then the algorithm returns (block 1102). If the CPU index is valid, the algorithm determines whether the message being processed is a reset acknowledgment from the compression CPU (block 1203). If yes, then the algorithm returns at block 1202. If not, then the algorithm gets the compression CPU resource table entry, and updates the flow control parameters in the table indicating a number of outstanding packets. Next, the process gets the associated client table entry (block 1205). The process then determines whether the data buffer subject of the compression has expired at block 1206. If it has expired, then the data buffer is released and the algorithm returns (block 1207). If it has not expired, then the data buffer is sent to the client for further processing (block 1208).

Figure 13:
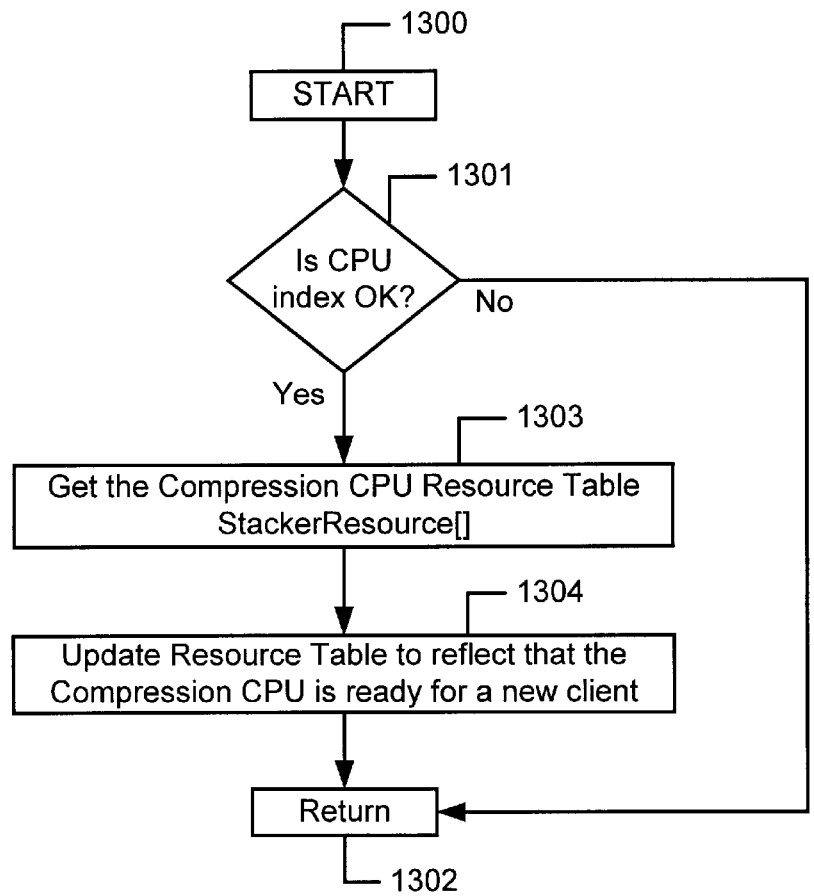
FIG. 13 is a procedure called to release a service CPU for a data channel when an account is closed for the data channel in the system of FIG. 3.

FIG. 13 illustrates the process utilized to release a compression CPU for a client. This process is called when a client closes an account at block 1300. The process first checks whether a CPU index is valid (block 1301). If not, the algorithm is complete (block 1302). If it is valid, then the compression CPU resource table is retrieved (block 1303). Next, the resource table is updated to reflect that the compression CPU is ready for a new client (block 1304). After updating the resource table, the algorithm returns (block 1302).

Figure 14:
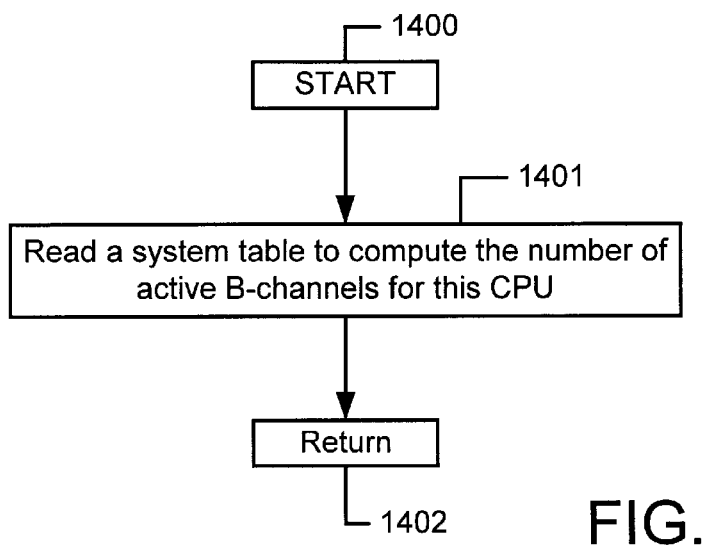
FIG. 14 is a procedure used to determine the number of channels currently active in a particular CPU in the system of FIG. 3.

FIG. 14 illustrates the process executed by the management CPU to determine how busy the compression CPU is in terms of the number of channels currently active through the associated processor complex. This algorithm begins at block 1400 when called. The algorithm proceeds to read a system table to compute the number of active calls, indicated by the number of busy ISDN standard B-channels for this CPU (block 1401). Finally, the result is returned (block 1402).

Figure 15A:
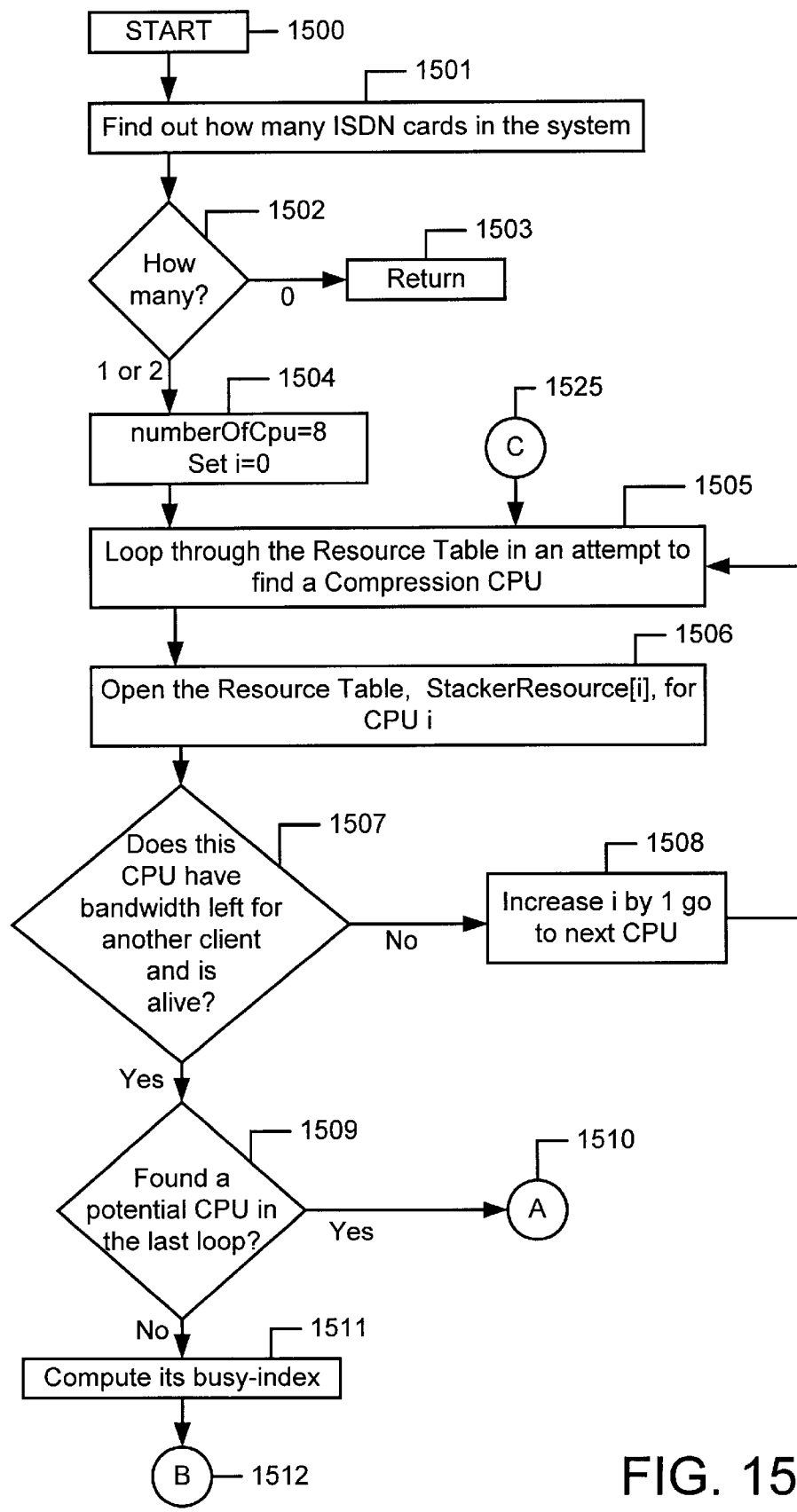
FIGS. 15A through 15C illustrate the procedure utilized to determine an available resource for a channel requesting service in the system of FIG. 3.
Figure 15B:
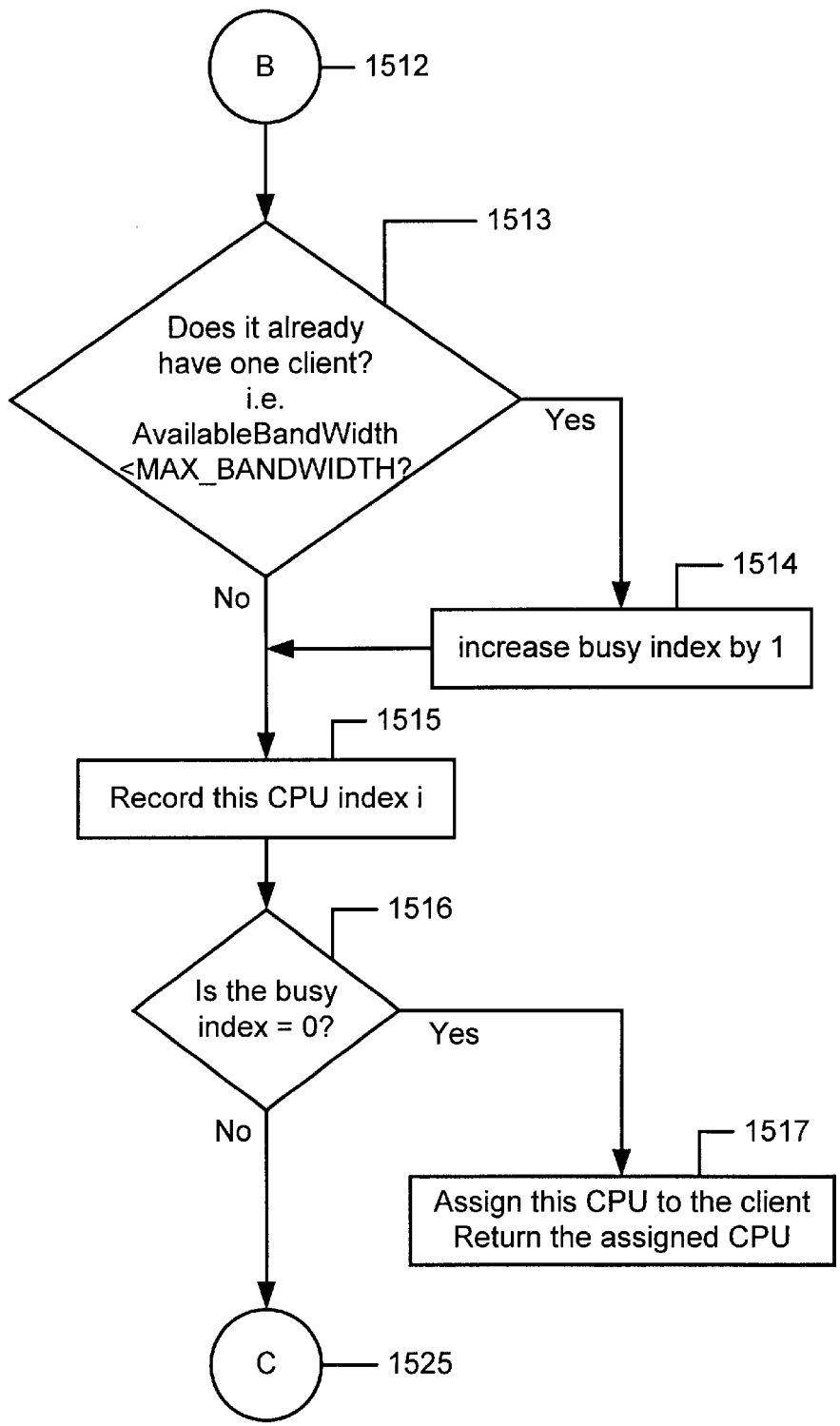
Figure 15C:
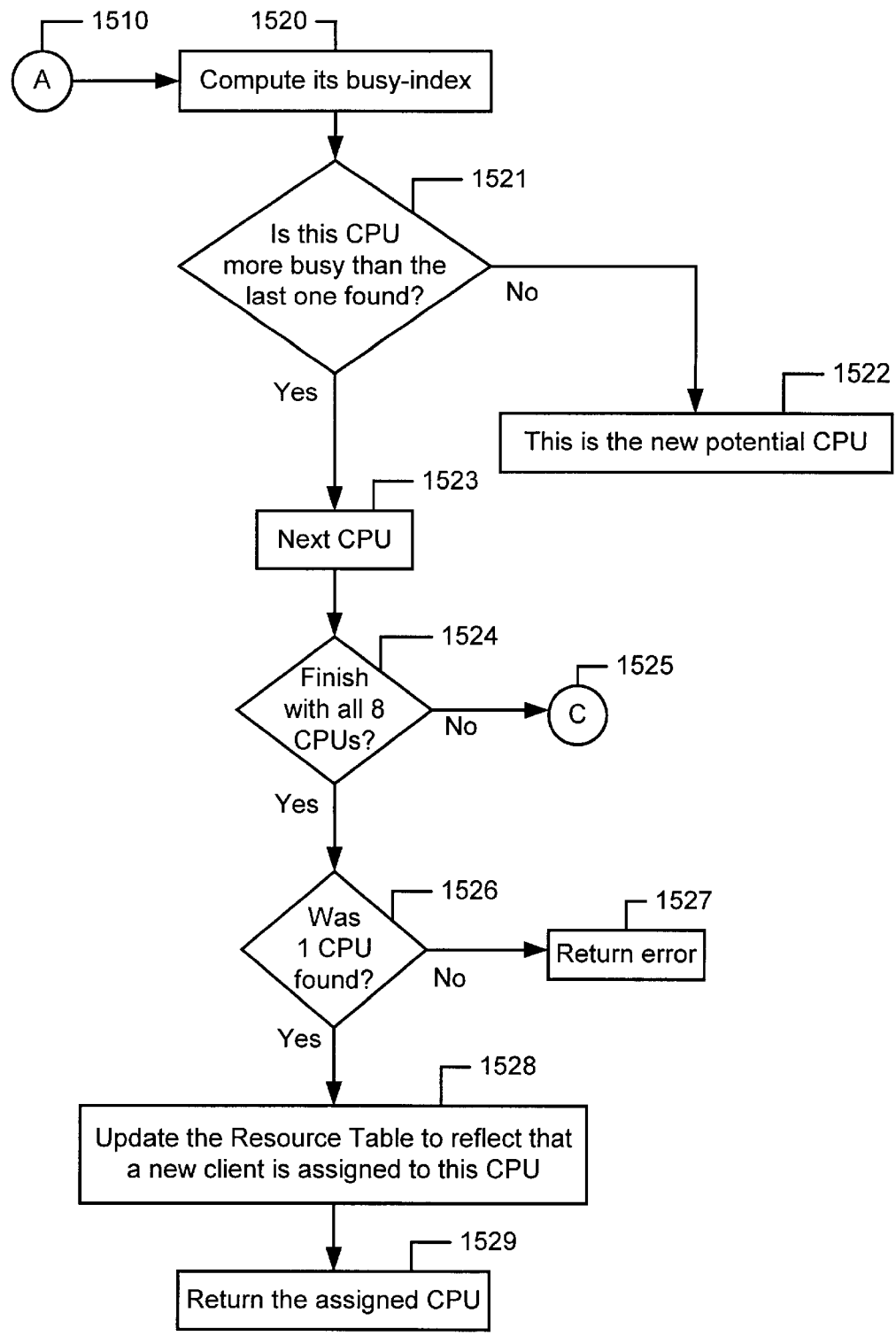

FIGS. 15A through 15C illustrate the process executed by the management processor to look for available resources in the resource table. The algorithm is called in block 1500. The first step is to determine how many ISDN cards are in the system (block 1501). The next block tests how many were found (block 1502). If none were found, then the algorithm returns at block 1503. If one or two were found, the number of CPUs on the cards is set and an index i is set to 0 (block 1504). The algorithm then loops through the resource table to find a compression CPU (block 1505). This process involves opening a resource table for index i of CPU i (block 1506). Based on the resource table, the algorithm determines whether the CPU has available bandwidth for another client and whether the CPU is alive (block 1507). If the CPU is not alive or does not have available bandwidth, then the index i is increased by one, and the index loops to the next CPU by returning to block 1505 (block 1508). If the CPU is alive and has available bandwidth, then the algorithm determines whether a potential CPU for this channel was found in the last loop (block 1509). If yes, then the algorithm branches to point A, in FIG. 15C (block 1510). If no CPU was found in the last loop, then the busy index for the CPU is computed by the process of FIG. 14 (block 1511), and then the algorithm loops to point B of FIG. 15B (block 1512).

FIG. 15B illustrates the continuation of the process after block 1512 of FIG. 15A. Thus, after computing the busy index, the algorithm determines whether the CPU already has a client, by determining the available bandwidth (block 1513). If the available bandwidth is less than 128K (the maximum bandwidth), then the CPU has one client already.

If the compression CPU already has a client, then the busy index for this compression CPU is increased by one (block 1514). Then, the busy index is recorded for the CPU at index i (block 1515). If at block 1513 it is determined that the CPU does not have a client, then the CPU busy index is recorded at block 1515.

In the next step, it is determined whether the busy index is equal to 0 for the CPU (block 1516). If the busy index indicates that the CPU is not in use, then the CPU is assigned to the client and the assigned CPU is returned (block 1517). If the busy index is not 0 at block 1516, then the algorithm returns to block 1508 to continue looping through the resource table at point C (block 1525).

FIG. 15C illustrates the process executed at point A 1510 of FIG. 15A. If a potential CPU had been found in the resource table and this CPU was active and had available bandwidth, then the process in FIG. 15C is executed. Thus, the algorithm begins with computing the busy index for the current CPU (block 1520). The algorithm determines at this point whether the current CPU is more busy than the potential CPU found in the last loop (block 1521). If it is not more busy, then the current CPU is assigned as the new potential CPU (block 1522). If it is more busy, then the index goes to the next CPU by increasing the index i by one (block 1523). Next, the algorithm determines whether all 8 CPUs have been tested (block 1524). If not, then the algorithm returns to point C in FIG. 15A to continue looping through the resource table (block 1525).

After testing all CPUs as indicated in block 1504, the algorithm determines whether a potential CPU is found (block 1526). If not, then an error is returned (block 1527). If a CPU is found, then the resource table is updated to reflect that the new client is assigned to this CPU (block 1528) and the assigned CPU is returned (block 1529).

Figure 16:
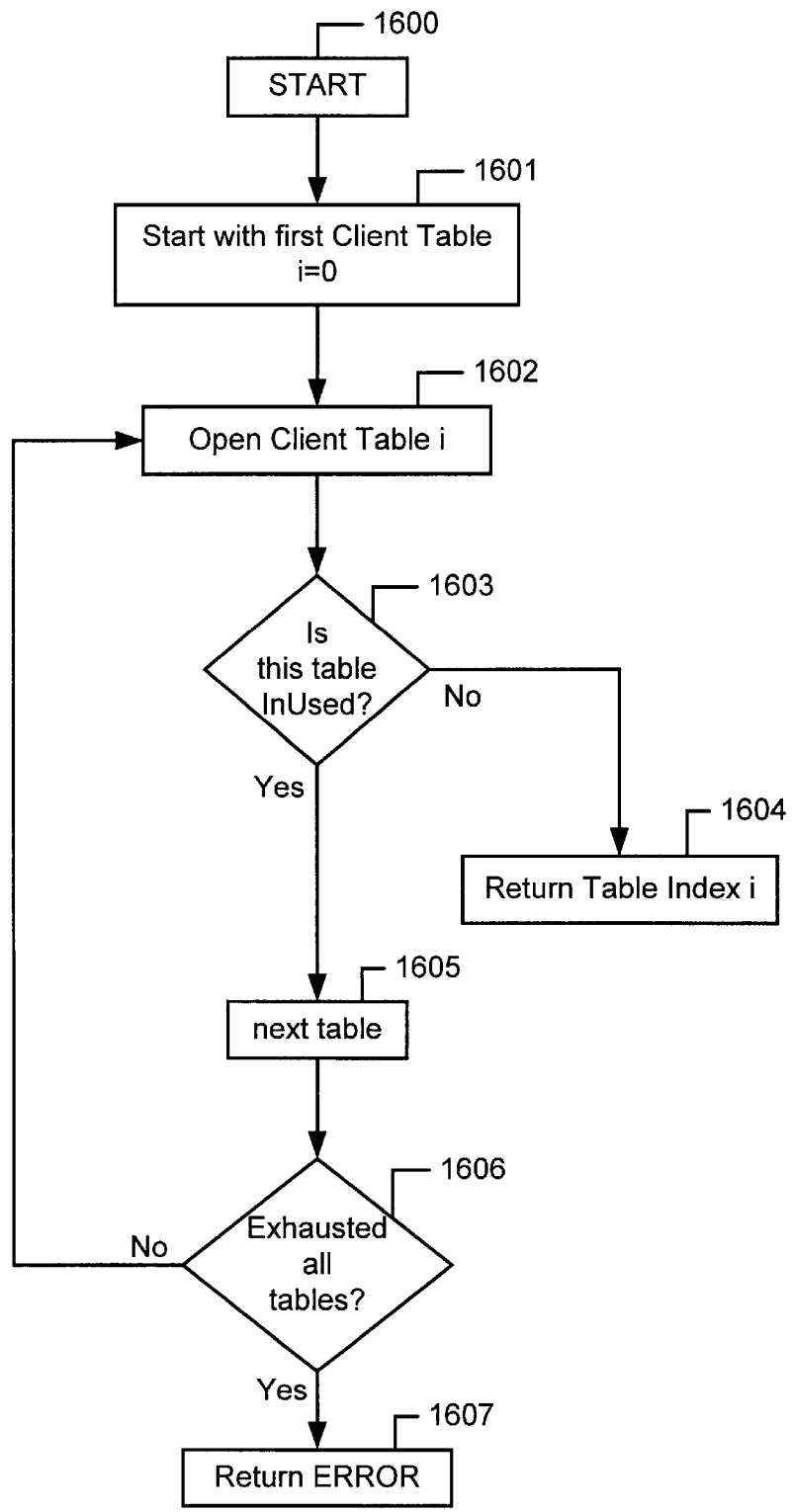
FIG. 16 is a flowchart of a procedure utilized to open an account not in use for a client channel in the system of FIG. 3.

FIG. 16 is the algorithm executed after a call at block 501 of FIG. 5 to get a client table that is not in use. The algorithm begins at block 1600 and proceeds to test the first client table entry with index i equal to 0 (block 1601). The algorithm opens client table with index i at block 1602. It determines whether this table entry is marked for use (block 1603). If it is not in use, then this table index i is returned (block 1604) as the client table entry to be utilized. If it is marked in use, then the index i is incremented to test the next table entry (block 1605). The algorithm determines whether all tables have been tested (block 1606). If not, then the algorithm loops back to block 1602 to continue searching for a client table to be utilized. If all tables have been exhausted at block 1606, then an error is returned (block 1607).

FIG. 17 illustrates the process utilized to send the data buffer to a compression engine CPU which is called by the process of FIG. 7, block 703 or FIG. 8, block 803. Thus, the algorithm begins at block 1700. The first step is to open the client table for the data channel (block 1701). The algorithm determines whether the client table entry is valid (block 1702). If not, an error is returned (block 1703). If the client table is valid, then the resource table is assigned and the client table is opened for the client (block 1704). The algorithm then determines whether the flow control counter for data channel has reached the maximum of packets outstanding (block 1705). If it has reached the maximum, the data buffer is released (block 1706), and it is returned without forwarding the packet. If the maximum outstanding[]number of packets has not been reached, then the user area is set up in the data buffer to be sent to the compression CPU (block 1707). Then a command procedure to send the packet to the compression CPU is called (block 1708). Finally, the process returns at block 1709.

Figure 18:
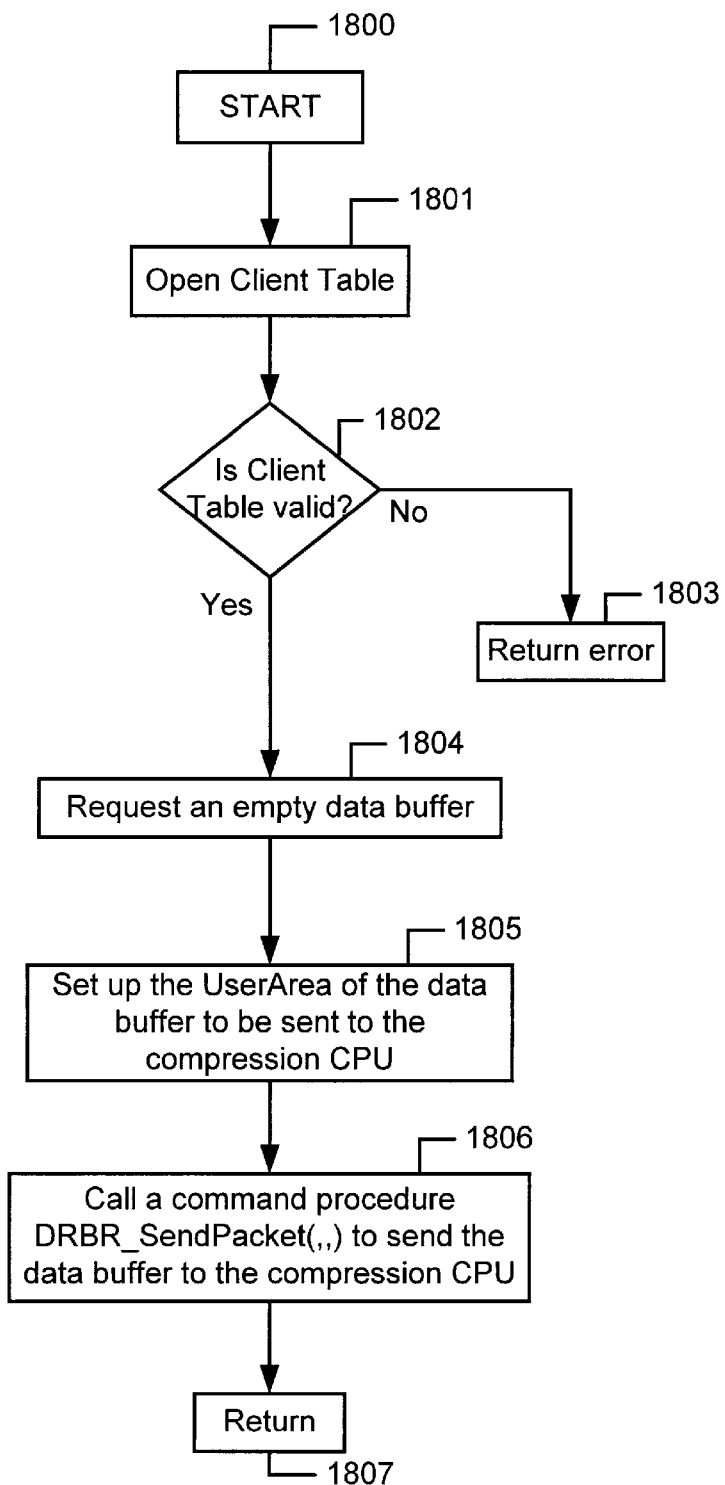
FIG. 18 is a flowchart of a procedure used to reset a compression history table in the system of FIG. 3.

FIG. 18 illustrates the process called by a client to reset the compression history table, such as when errors are detected. Thus, the process starts at block 1800. The first step is to open the client table for the data channel (block 1801). The algorithm determines whether the client table is valid (block 1802). If not, then an error is returned (block 1803). If the client table is valid, then the process requests an empty data buffer (block 1804). Next, a user area of the data buffer is set up to be sent to the compression CPU (block 1805). Next, a command procedure is called to send the empty data buffer to the compression CPU to reset the compression history table (block 1806). Finally, the process is completed (block 1807).

FIG. 19 illustrates the process called by a client to inform the compression interface module which procedure to call when the data buffer has been processed by the compression CPU. The client also sends the maximum received unit parameter to the compression CPU. If the compression process results in an expansion, i.e., the compression data is longer than the original uncompressed data, and the expanded data is longer than the maximum receive unit parameter, the compression CPU returns the original uncompressed data.

This process begins at block 1900. The first step is to open the client table for the channel (block 1901). The algorithm determines whether the client table is valid (block 1902). If not, an error is returned (block 1903).

If the client table is valid, then the parameters and procedure names are recorded which have been passed by the client to the client table (block 1904). The algorithm then requests an empty data buffer at block 1905. The user area is set up in the data buffer at block 1906 to be sent to the compression CPU. The command procedure is called to send the data buffer to the compression CPU to carry the parameters and procedure names from the client table (block 1907). Finally, the process is completed at block 1908.

Accordingly, data compression services are provided by the ISDN subsystems according to the present invention as a side job by the processor complexes on the ISDN cards. In the embodiment being described, only one compression/decompression algorithm is supported, particularly the algorithm referred to as Stacker LZS, licensed from Stac Electronics, Inc. Other algorithms can be supported to the needs of the particular implementation, such as V.42bis standard compression algorithm, and as mentioned above, more than one algorithm can be utilized. Furthermore, the present invention can be extended to provide encryption and decryption services and other encoding and decoding type services provided on data channels.

According to the present invention, the interface functions for the managing CPU are provided such as described above as with reference to FIGS. 5–19, to access and manage the compression services provided by the ISDN subsystems. Depending on the number of ISDN cards configured, the system may have four or eight compression "engines". Each processor complex on the I/O cards has resources available to service up to two independent channels with the Stacker LZS algorithm. This limitation is imposed by the fact that the resources on the I/O cards are capable of supporting two history tables only. One history table is assigned to a client and each history table can be independently reset using the algorithms described. Note that the two clients service by the processor complex may be B-channels controlled by other CPUs in the system. The maximum number of clients operable in the system as set up in this example is 16.

Each processor complex on the ISDN cards can service client/channels with bandwidth totalling up to 128 kilobytes per second. Bandwidth is allocated in 64 kilobyte blocks. If a client requests more than 64 kilobytes, then the interface function looks for a processor complex which currently has no clients. No more than 128 kilobytes can be assigned to a single client.

The assignment of a processor complex to a client is based on its busy index. If the processor complex already has one client, its busy index is incremented. A call connection on a B-channel also increments the busy index by 1. Thus, the system operates to make utilization of the compression/decompression resources more efficient on a non-fully loaded system.

Because resource bandwidth is distributed on a first-come, first-serve basis, and the B-channel call connection times are random in nature, it is possible that all processor complexes in the system are only half utilized at any given time. The next client requesting 128 kilobytes per second will be turned away in this circumstance. It is possible as an alternative to reserve some processor complexes for 128 kilobyte per second clients only. However, this may result in some 64 kilobyte clients being turned away, even though there are idle resources on the reserved 128 kilobyte compressor complexes. This concept can be extended to handling a variety of different kinds of algorithms, as mentioned above, using a variety of allocation schemes to optimize resource utilization, and traffic patterns in a particular server.

To request service, a client first opens an account with the required bandwidth. If resources are available, service is granted and a client ID is returned. This client ID is used during the entire compression/decompression session. The bandwidth allocation stays fixed for the session. If, for example, the client wants to increase the bandwidth from 64 kilobytes to 128 kilobytes, a new account has to be opened. When opening an account, the client also specifies a maximum packet size. If the data expanded after compression, as possible using the Stacker LZS algorithm, and the length is bigger than the specified limit, then the original data is returned to the client. The compression history is then reset.

If no resource is available at a processor complex, or, for example, if the buffers have been depleted, the original data is returned to the client. The managing processor keeps track of the number of outstanding packets sent to each processor complex. If the number of outstanding packets reaches 16, then any new data from the client is thrown away in this example to preserve resources.

To have data compressed or decompressed, a client puts the data in a data buffer in a shared memory, as specified in the function to call back when the result it ready. When the result is ready, the interface module calls the function specified by the client. For example, a longitudinal check byte flnction may be supported, then can be returned to the user at the end of the service.

In the embodiment described, the two history tables can be reset independently any number of times. When the compression services are no longer needed, the client calls a fuiction to close the account. This frees up resources and makes them available for the next client. If a processor complex is down, the return function that is specified by the client is called to notify the channel of such an event.

Accordingly, the present invention provides a multiprocessor system which manages the distribution of signal processing services for data channels which are processed in the system. This allows for allocation of processing resources to optimize the system for the traffic patterns encountered in the system, to meet the needs of the particular design. The architecture of the present invention provides greater resource utilization, better performance, and overall greater compression and decompression throughput than is available in the prior art for a given set of processors.

The foregoing description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

What is claimed is:

1. In a data processing system including a plurality of processors and wherein the data channels comprise data flows in multi-packet sessions having channel bandwidths and a plurality of input/output ports, and wherein processors in the plurality of processors are coupled respectively with at least one input/output port, a method for managing signal processing on data channels using the plurality of input/output ports, comprising the steps of:

providing a management resource for signal processing services distributed in the plurality of processors;

requesting signal processing services from the management resource, in response to activity of a session on a particular data channel using one of the plurality of input/output ports;

selecting in the management resource in response to the request, one of the plurality of processors having available bandwidth as a service processor for the particular data channel; and routing the activity of the session on the particular data channel through the service processor at about the channel bandwidth of the data channel for use of the signal processing services in the service processor.

2. The method of claim 1, wherein the step of selecting includes:

monitoring utilization of resources in the plurality of processors; and selecting a processor from the plurality of processors as the service processor in response to the step of monitoring.

3. The method of claim 2, wherein the step of monitoring includes maintaining a table in the management resource indicating levels of utilization for processors in the plurality of processors.

4. The method of claim 2, wherein the step of monitoring utilization includes determining whether the corresponding input/output ports for the plurality of processors are busy.

5. The method of claim 2, wherein the processors in the plurality of processors have limited signal processing resources, and the step of monitoring utilization includes determining an amount of available signal processing resources for the processors in the plurality of processors.

6. The method of claim 1, wherein the step of routing includes executing a prespecified function upon completion of signal processing services in the service processor for the activity.

7. The method of claim 1, wherein the step of routing includes establishing a table in the management resource indicating for each active data channel, the processor to which the activity on the data channel is routed and a function to be executed upon completion of signal processing services in the service processor for the activity.

8. The method of claim 1, wherein the step of requesting includes specifying a function to be executed upon completion of signal processing services in the service processor for the activity.

9. The method of claim 1, wherein the step of requesting includes specifying a particular signal processing service for the activity, and the step of selecting is responsive to the particular signal processing service.

10. The method of claim 1, wherein the step of requesting includes specifying a bandwidth for the activity, and the step of selecting is responsive to the specified bandwidth.

11. The method of claim 1, wherein the signal processing services include compression and decompression.

12. The method of claim 1, wherein the signal processing services include encryption and decryption.

13. The method of claim 1, wherein the signal processing services include encoding and decoding.

14. In a communication server including a set of input/output ports and a set of processors, in which input/output ports in said set of input/output ports are coupled to corresponding processors in said set of processors, a method for distributing compression and decompression tasks for data channels supporting data flows in multi-packet sessions having respective channel bandwidths on said set of input/output ports to said set of processors, comprising the steps of:

maintaining resource information for said set of processors, the resource information concerning levels of utilization of processors in said set of processors;

detecting, in the corresponding processors, activity in sessions on data channels through input/output ports in said set of input/output ports;

sending requests, in response to the detected activity, from the corresponding processors to a managing processor in said set of processors, said requests identifying compression or decompression services needed for the detected activity;

selecting in the managing processor in response to the resource information and the requests, service processors from said set of processors to provide compression or decompression services identified in the requests for the detected activity on the data channels; and routing the detected activity in the session on the data channels at about the channel bandwidth to the selected service processors.

15. The method of claim 14, wherein processors in said set of processors have compression and decompression resources capable of handling limited numbers of channels, and the resource information includes numbers of channels being handled by processors in said set of processors.

16. The method of claim 14, wherein processors in said set of processors have compression and decompression resources capable of handling limited bandwidths, and the resource information includes bandwidths channels being handled by processors in said set of processors.

17. The method of claim 14, wherein processors in said set of processors have compression and decompression resources capable of handling a plurality of compression/decompression algorithms, and wherein the requests identify respective ones of the plurality of compression/decompression algorithms for the data channels.

18. The method of claim 14, wherein the requests identify a bandwidth for activity on the channels, and the step of selecting is responsive to the identified bandwidth.

19. The method of claim 14, wherein the requests identify a function to be executed upon completion of execution of compression/decompression processes for a corresponding channel, and the step of routing includes calling the identified function.

20. The method of claim 14, wherein the step of routing includes establishing a table coupled to the management processor indicating for each active channel, the processor to which the channel is routed and a function to be executed upon completion of execution of compression/decompression services in the service processor for activity on the channel.

21. The method of claim 14, wherein the resource information includes indications of whether the input/output ports of corresponding processors in said set of processors are busy.

22. The method of claim 14, wherein a subset of said set of input/output ports comprises one or more ISDN ports.

23. The method of claim 14, wherein a subset of said set of input/output ports comprises one or more wide area network ports.

24. The method of claim 14, wherein a subset of said set of input/output ports comprises one or more local area network ports.

25. The method of claim 14, wherein a first subset of said set of input/output ports comprises one or more local area network ports, and a second subset of said set of input/output ports comprises one or more wide area network ports.

26. A communication server, comprising:

a plurality of input/output ports;

a plurality of processors, coupled to corresponding input/output ports in the plurality of input/output ports, processors in the plurality of processors including respective signal processing resources to provide encoding and decoding service to multi-packet sessions on data channels having channel bandwidths, and including resources for managing data channels through corresponding input/output ports, detecting requirements for encoding or decoding services in the managed data channels and supplying requests for detected requirements; and data channel management resources in at least one processor in the plurality of processors, responsive to requests for detected requirements for encoding and decoding services, which routes sessions on data channels for which said services are requested at about the channel bandwidths of the sessions to processors in the plurality of processors having available signal processing resources.

27. The communication server of claim 26, wherein the signal processing resources comprise compression and decompression resources.

28. The communication server of claim 27, wherein the compression and decompression resources in at least one processor in the plurality of processors, include resources to execute a plurality of compression/decompression algorithms, and wherein the data channel management resources are responsive to the compression/decompression algorithms of the data channels to route the data channels.

29. The communication server of claim 26, wherein the signal processing resources comprise encryption and decryption resources.

30. The communication server of claim 26, wherein signal processing resources in the plurality of processors are capable of handling limited numbers of channels, and the data channel management resources are responsive to numbers of channels being handled by processors in said plurality of processors.

31. The communication server of claim 26, wherein signal processing resources in the plurality of processors are capable of handling limited bandwidths, and the data channel management resources are responsive to bandwidths of channels being handled by processors in said plurality of processors.

32. The communication server of claim 26, wherein the requests identify a function to be executed upon completion of encoding or decoding processes for a corresponding channel, and the data channel management resources include logic, responsive to the requests, to call the identified function.

33. The communication server of claim 26, wherein the data channel management resources include a store indicating for each active channel, the processor to which the channel is routed and a function to be executed upon completion of execution of signal processing services in the service processor for activity on the channel.

34. The communication server of claim 26, wherein the data channel management resources include a store for resource information concerning availability of signal processing resources in the plurality of processors.

35. The communication server of claim 34, wherein the resource information includes indications of whether the input/output ports of corresponding processors in the plurality of processors are busy.

36. The communication server of claim 34, wherein the resource information includes indications of available bandwidth for signal processing resources in processors in the plurality of processors.

37. The communication server of claim 26, wherein a subset of the plurality of input/output ports comprises one or more ISDN ports.

38. The communication server of claim 26, wherein a subset of the plurality of input/output ports comprises one or more wide area network ports.

39. The communication server of claim 26, wherein a subset of the plurality of input/output ports comprises one or more local area network ports.

40. The communication server of claim 26, wherein a first subset of the plurality of input/output ports comprises one or more local area network ports, and a second subset of the plurality of input/output ports comprises one or more wide area network ports.

41. The communication server of claim 26, wherein one of the plurality of processors is a management processor, and the data channel management resources comprise logic executed by the management processor, and said requests are directed to the management processor.

42. A communication server, comprising:

memory;

a plurality of input/output devices, the input/output devices respectively including input/output ports, processors, logic executed by the processors for establishing data channels having channel bandwidths through the input/output ports and storing data from the data channels in the memory, and compression and decompression logic executed by the processors; and a central processor, coupled to the memory, including communication routing logic executed by the central processor to route data from data channels at about the channel bandwidths among the plurality of input/output devices, and including compression/decompression management logic executed by the central processor to allocate the compression and decompression logic in the plurality of input/output devices to data channels requiring compression and decompression service in response to levels of utilization of the processors in the plurality of input/output devices.

\* \* \* \* \*